US009723651B2

(12) United States Patent
Ozturk et al.

(10) Patent No.: US 9,723,651 B2
(45) Date of Patent: Aug. 1, 2017

(54) ENHANCED CONNECTION MANAGEMENT FOR MULTIPLE ACCESS NETWORKS

(71) Applicant: QUALCOMM Incorporated, San Diego, CA (US)

(72) Inventors: Ozcan Ozturk, San Diego, CA (US); Jun Wang, Poway, CA (US); Aleksandar Damnjanovic, Del Mar, CA (US); Madhavan Srinivasan Vajapeyam, San Diego, CA (US); Ravindra Manohar Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/935,051

(22) Filed: Nov. 6, 2015

(65) Prior Publication Data

US 2016/0135247 A1    May 12, 2016

Related U.S. Application Data

(60) Provisional application No. 62/077,637, filed on Nov. 10, 2014.

(51) Int. Cl.
*H04W 36/00* (2009.01)
*H04W 76/04* (2009.01)
(Continued)

(52) U.S. Cl.
CPC ..... *H04W 76/046* (2013.01); *H04W 36/0016* (2013.01); *H04W 36/0094* (2013.01);
(Continued)

(58) Field of Classification Search
CPC . H04W 76/046; H04W 76/048; H04W 68/02; H04W 36/0094; H04W 36/0016; H04W 88/06; H04W 52/0212
(Continued)

(56) References Cited

U.S. PATENT DOCUMENTS 5,881,055 A *  3/1999  Kondo ............... H04B 1/1615
                                                   370/311
7,496,367 B1 *  2/2009  Ozturk ................ H04L 47/10
                                                   370/329
(Continued)

FOREIGN PATENT DOCUMENTS

WO    WO-2013024435 A1    2/2013
WO    WO-2014059614 A1    4/2014

OTHER PUBLICATIONS

Fan et al., "UE Power Saving with RRC Semi-Connected State in LTE," 2014 Wireless Telecommunications Symposium, Washington, DC, Apr. 9-11, 2014, 5 pgs., XP_32606513A, ISBN 978-1-4799-1297-1, Institute of Electrical and Electronics Engineers.
(Continued)

*Primary Examiner* — Marceau Milord

(57) ABSTRACT

Semi-connected state operation for UEs in multiple-access networks is described. In the semi-connected state, UEs may monitor system information and paging, and mobility may be UE-controlled. Base stations may determine whether to transition UEs from the connected state to the semi-connected state based on capabilities, priority, data connections, or loading conditions. Base stations may maintain context information and logical traffic connections for UEs while UEs continue to be served by the base station in the semi-connected state. Thus, when a transition from the semi-connected state to the connected state occurs, the base station does not have to re-establish security parameters, nor re-establish logical traffic connections within the network for carrying control plane and user plane data for the UE. Context information for semi-connected state UEs may be shared between neighboring base stations or base stations within a context area. The techniques may be applied to LTE/LTE-A networks.

30 Claims, 18 Drawing Sheets

(51) Int. Cl.
  *H04W 68/02* (2009.01)
  *H04W 52/02* (2009.01)
  *H04W 88/06* (2009.01)
(52) U.S. Cl.
  CPC ....... *H04W 52/0212* (2013.01); *H04W 68/02* (2013.01); *H04W 76/048* (2013.01); *H04W 88/06* (2013.01); *Y02B 60/50* (2013.01)
(58) Field of Classification Search
  USPC .............. 455/436, 439, 442, 63.1, 67.11
  See application file for complete search history.

(56) References Cited

U.S. PATENT DOCUMENTS

| 2012/0281566 | A1* | 11/2012 | Pelletier | H04W 76/046 370/252 |
| 2013/0046821 | A1* | 2/2013 | Alanara | H04W 52/0216 709/204 |
| 2014/0148174 | A1* | 5/2014 | Teyeb | H04W 36/0083 455/441 |
| 2014/0198699 | A1* | 7/2014 | Makharia | H04W 52/0216 370/311 |
| 2015/0208327 | A1* | 7/2015 | Baratam | H04W 68/00 455/432.1 |
| 2015/0257094 | A1* | 9/2015 | Wei | H04W 52/0212 370/311 |
| 2016/0066255 | A1* | 3/2016 | Marinier | H04W 48/16 370/350 |
| 2016/0183192 | A1* | 6/2016 | Kang | H04W 52/0254 370/311 |

OTHER PUBLICATIONS

ISA/EPO, International Search Report and the Written Opinion of the International Searching Authority, Int'l App. No. PCT/US2015/059742, Feb. 18, 2016, European Patent Office, Rijswijk, NL, 16 pgs.

Renesas Mobile Europe Ltd., "RAN Aspects of 'Fast Path' and 'Connectionless' Solution Directions," 3GPP TSG-RAN WG2 Meeting #82, R2-131894, Fukuoka, Japan, May 20-24, 2013, 4 pgs., XP_50699925A, 3rd Generation Partnership Project.

* cited by examiner

ENHANCED CONNECTION MANAGEMENT FOR MULTIPLE ACCESS NETWORKS

CROSS REFERENCES

The present application for patent claims priority to U.S. Provisional Patent Application No. 62/077,637 by Ozturk et al., entitled "Enhanced Connection Management for Multiple Access Networks," filed Nov. 10, 2014, assigned to the assignee hereof, and expressly incorporated by reference herein.

BACKGROUND

Field of the Disclosure

The present disclosure, for example, relates to wireless communication systems, and more particularly to communication states of wireless devices in multiple access wireless communication systems.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, each of which may be referred to as a user equipment (UE). A base station may communicate with UEs on downlink channels (e.g., for transmissions from a base station to a UE) and uplink channels (e.g., for transmissions from a UE to a base station).

Communication states may be used for various modes of operation of wireless devices. The communication states may define various radio protocol procedures for the wireless devices and base stations such as monitoring system information, monitoring of paging channels, monitoring of control channels for scheduling data transmissions, and the like. The communication state for a wireless device may depend on the connection status of a link between the wireless device and a base station. State transitions may incur latency in data transmissions, which may be noticeable for certain types of communications. Reducing latency in data transmissions while operating under a limited power budget presents challenges in wireless communications.

SUMMARY

The described features generally relate to one or more improved systems, methods, and/or apparatuses for semi-connected state operation. In the semi-connected state, UEs may monitor system information and paging, and in some examples mobility may be UE-controlled. Base stations may manage state transitions for UEs that are camped on, served by, or otherwise connected to the base stations, and may determine whether to transition specific UEs that are currently in the connected state to the semi-connected state or the idle state when inactivity is detected. Whether to transition a specific UE from the connected state to the semi-connected state may be based on capabilities, priority, or data connections of the UE, or conditions such as loading at the base stations. The UE may continue to be served by the base station in semi-connected state, and the base station may maintain context information and logical traffic connections for the UE. In examples where the context is maintained, and in some examples where the logical traffic connections are maintained, when a transition from the semi-connected state to the connected state occurs for a UE, the base station does not have to re-establish security mode parameters, nor re-establish logical traffic connections within the network for carrying control plane and user plane data for the UE. In some examples, context information for semi-connected state UEs may be shared between neighboring base stations or base stations within a context area.

A method for wireless communication at a base station is described. The method may include: determining, for a UE served by the base station and configured in a connected state with the base station, that the UE is to be transitioned out of the connected state; indicating to the UE that the UE should transition out of the connected state; and maintaining a context for the UE at the base station subsequent to the indicating that the UE should transition out of the connected state and while the UE continues to be served by the base station.

An apparatus for wireless communication at a base station is described. The apparatus may include: means for determining, for a UE served by the base station and configured in a connected state with the base station, that the UE is to be transitioned out of the connected state; means for indicating to the UE that the UE should transition out of the connected state; and means for maintaining a context for the UE at the base station subsequent to the indicating that the UE should transition out of the connected state and while the UE continues to be served by the base station.

A further apparatus for wireless communication by a base station is described. The apparatus may include a processor and a memory in electronic communication with the processor and instructions stored in the memory. The instructions may executable by the processor to cause the apparatus to: determine, for a UE served by the base station and configured in a connected state with the base station, that the UE is to be transitioned out of the connected state; indicate to the UE that the UE should transition out of the connected state; and maintain a context for the UE at the base station subsequent to the indicating that the UE should transition out of the connected state and while the UE continues to be served by the base station.

A non-transitory computer-readable medium storing code for wireless communication by a base station is described. The code may include instructions executable to: determine, for a UE served by the base station and configured in a connected state with the base station, that the UE is to be transitioned out of the connected state; indicate to the UE that the UE should transition out of the connected state; and maintain a context for the UE at the base station subsequent to the indicating that the UE should transition out of the connected state and while the UE continues to be served by the base station.

Some examples of the method, apparatuses, or non-transitory computer readable medium may include processes, features, means, or instructions for: receiving an access request from the UE when the UE is out of the connected state; associating the context for the UE with the UE for connected-state operations of the UE; and indicating to the UE that the UE should transition to the connected state according to the context for the UE.

Some examples of the method, apparatuses, or non-transitory computer readable medium may include processes, features, means, or instructions for: determining, after the UE transitions out of the connected state, that the UE should transition to an idle state; indicating to the UE that the UE should transition to the idle state; and releasing the context for the UE. In some examples of the method, apparatuses, or non-transitory computer readable medium the determining that the UE should transition to the idle state is based on any of expiration of an idle timer, an overload condition, a data traffic type associated with at least one logical traffic connection of the UE, an access point name (APN) associated with the at least one logical traffic connection, or combinations thereof. In some examples of the method, apparatuses, or non-transitory computer readable medium the indicating to the UE that the UE should transition to the idle state includes processes, features, means, or instructions for sending a second connection release message indicating that the UE should transition to the idle state.

Some examples of the method, apparatuses, or non-transitory computer readable medium may include processes, features, means, or instructions for: transmitting a validation paging message to the UE according to a periodic validation interval after the UE transitions out of the connected state; and releasing the context for the UE if a validation response is not received from the UE.

Some examples of the method, apparatuses, or non-transitory computer readable medium may include processes, features, means, or instructions for: receiving an indication from a network entity that the UE has reselected to a different base station; and releasing the context for the UE in response to receiving the indication.

Some examples of the method, apparatuses, or non-transitory computer readable medium may include processes, features, means, or instructions for: sending the context for the UE to at least one other base station associated with one or more of a context area of the base station, a tracking area of the base station, a neighbor list of the base station, or a neighbor list of the UE.

In some examples of the method, apparatuses, or non-transitory computer readable medium the context for the UE may include any of UE state information, UE security information, UE capability information, a radio resource control (RRC) configuration for the UE, an identity associated with at least one logical traffic connection for the UE, or combinations thereof.

In some examples of the method, apparatuses, or non-transitory computer readable medium the indicating to the UE that the UE should transition out of the connected state includes sending a first connection release message indicating that the UE should transition from the connected state to a semi-connected state, the semi-connected state associated with at least one of suppression of monitoring of a physical downlink control channel according to at least one temporary network identifier by the UE, suppression of monitoring of a user-specific search space in the physical downlink control channel a first discontinuous reception (DRX) cycle for paging of the UE that is shorter than a second DRX cycle for paging of the UE when the UE is in an idle state, suppression of reporting of channel state information by the UE, or suppression of availability of uplink control information resources for the UE.

Some examples of the method, apparatuses, or non-transitory computer readable medium may include processes, features, means, or instructions for: maintaining, at the base station, at least one logical traffic connection with at least one of a mobility management entity or a serving gateway for the UE after the UE transitions out of the connected state. In some examples of the method, apparatuses, or non-transitory computer readable medium the at least one logical traffic connection for the UE may include any of a logical connection for control plane traffic, a logical connection for user plane traffic, or combinations thereof.

In some examples of the method, apparatuses, or non-transitory computer readable medium the determining that the UE is to be transitioned out of the connected state is based on any of expiration of a connected-state timer, a data traffic condition, an indication from a serving gateway, a data traffic type associated with at least one logical traffic connection of the UE, an APN associated with the at least one logical traffic connection, or combinations thereof.

Some examples of the method, apparatuses, or non-transitory computer readable medium may include processes, features, means, or instructions for: determining whether the context for the UE should be maintained when the UE transitions out of the connected state based on any of a UE identity, a UE capability indicator, a UE configuration, UE priority information, UE data traffic history, UE connection history, a packet data network identifier associated with a data connection of the UE, a loading condition of the base station, or combinations thereof.

In some examples of the method, apparatuses, or non-transitory computer readable medium the base station may be an evolved NodeB (eNB) of a Long Term Evolution (LTE) or LTE-Advanced (LTE-A) wireless network.

A method for wireless communication at a UE is described. The method may include: establishing a radio resource configuration in a connected state to be served by a first base station of a wireless communications network; receiving, from the first base station, an indication that the UE is to transition to a semi-connected state; and maintaining at least a portion of the radio resource configuration after transitioning to the semi-connected state while continuing to be served by the first base station.

An apparatus for wireless communication at a UE is described. The apparatus may include: means for establishing a radio resource configuration in a connected state to be served by a first base station of a wireless communications network; means for receiving, from the first base station, an indication that the UE is to transition to a semi-connected state; and means for maintaining at least a portion of the radio resource configuration after transitioning to the semi-connected state while continuing to be served by the first base station.

A further apparatus for wireless communication by a UE is described. The apparatus may include a processor and a memory in electronic communication with the processor and instructions stored in the memory. The instructions may be executable by the processor to cause the apparatus to: establish a radio resource configuration in a connected state to be served by a first base station of a wireless communications network; receive, from the first base station, an indication that the UE is to transition to a semi-connected state; and maintain at least a portion of the radio resource configuration after transitioning to the semi-connected state while continuing to be served by the first base station.

A non-transitory computer-readable medium storing code for wireless communication by a UE is described. The code may include instructions executable to: establish a radio resource configuration in a connected state to be served by a first base station of a wireless communications network; receive, from the first base station, an indication that the UE is to transition to a semi-connected state; and maintain at least a portion of the radio resource configuration after transitioning to the semi-connected state while continuing to be served by the first base station.

Some examples of the method, apparatuses, or non-transitory computer readable medium may include processes, features, means, or instructions for: utilizing the at least a portion of the radio resource configuration to transition to a connected state while continuing to be served by the first base station.

Some examples of the method, apparatuses, or non-transitory computer readable medium may include processes, features, means, or instructions for: determining, autonomously from the first base station, that the UE should perform cell reselection to a second base station; sending an access request to the second base station; transitioning from being served by the first base station to being served by the second base station; and communicating with the second base station according to the at least a portion of the first radio resource configuration. Some examples of the method, apparatuses, or non-transitory computer readable medium may include processes, features, means, or instructions for: sending, in an initial user-plane communication with the second base station, a non-access stratum (NAS) message to a mobility entity of the wireless communications network; and terminating communication with the second base station upon determining that an NAS reply message has not been received from the mobility entity.

Some examples of the method, apparatuses, or non-transitory computer readable medium may include processes, features, means, or instructions for: determining, autonomously from the first base station, that the UE should perform cell reselection to a second base station; sending an access request to the first base station, where the access request includes one or more measurement parameters related to a handover to the second base station; and transitioning from being served by the first base station to being served by the second base station; and communicating with the second base station according to the at least a portion of the radio resource configuration.

In some examples of the method, apparatuses, or non-transitory computer readable medium the semi-connected state is associated with at least one of suppression of monitoring of a physical downlink control channel according to at least one temporary network identifier by the UE, suppression of monitoring of a user-specific search space in the physical downlink control channel, a first discontinuous reception (DRX) cycle for paging of the UE that is shorter than a second DRX cycle for paging of the UE when the UE is in an idle state, suppression of reporting of channel state information by the UE, or suppression of availability of uplink control information resources for the UE.

Some examples of the method, apparatuses, or non-transitory computer readable medium may include processes, features, means, or instructions for: receiving a validation paging message from the first base station; and sending a validation response to the first base station, where the validation response may include a random access preamble or an uplink control information message.

In some examples of the method, apparatuses, or non-transitory computer readable medium the at least a portion of the radio resource configuration may include any of radio resource control (RRC) security information, non-access stratum (NAS) security information, a temporary network identifier for the UE, or combinations thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
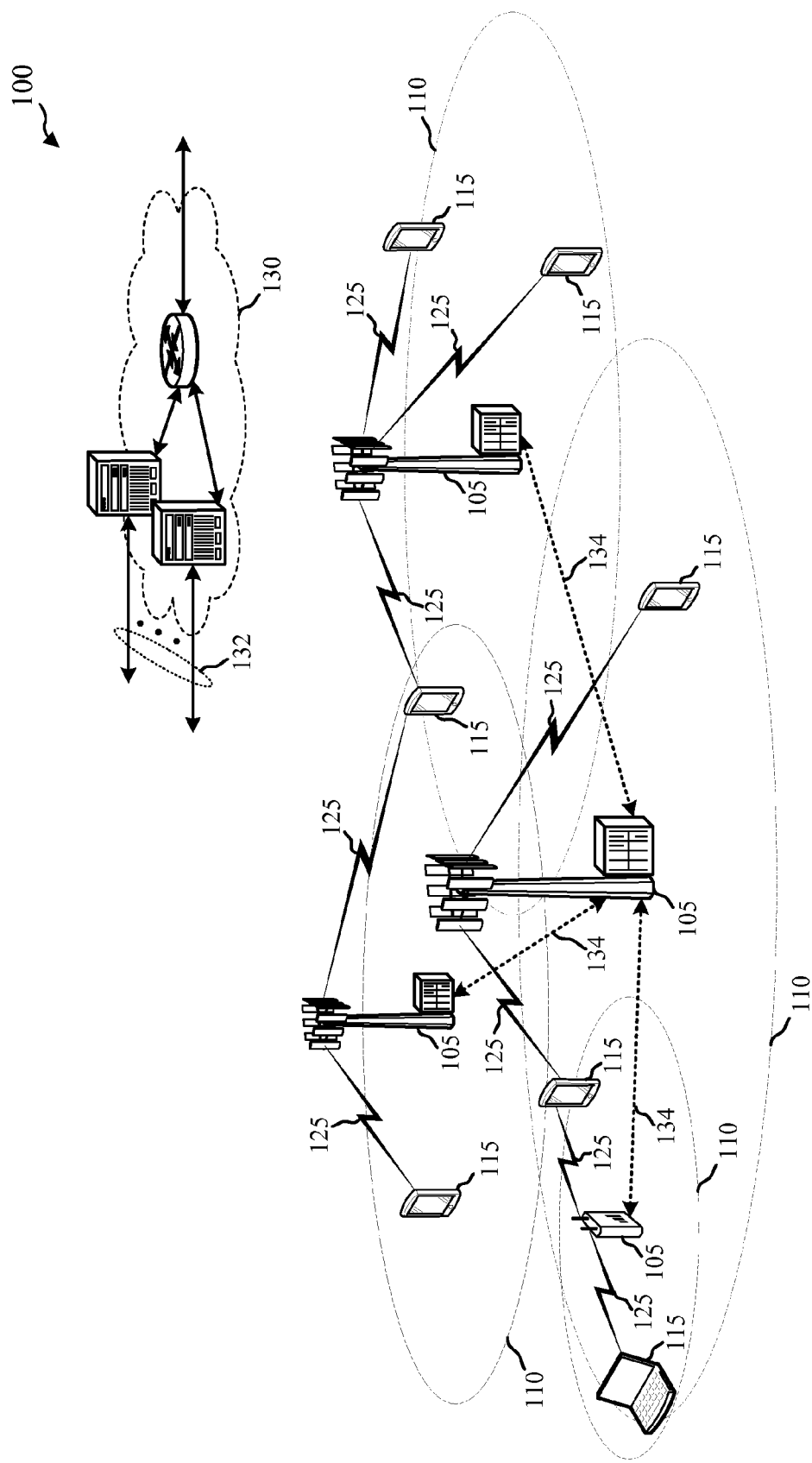
FIG. 1 illustrates an example of a wireless communications system in accordance with aspects of the present disclosure.

Techniques generally relating to one or more improved systems, methods, and/or apparatuses for semi-connected state operation. The semi-connected state for a UE may include UE-controlled mobility and monitoring for paging according to a semi-connected state discontinuous reception (DRX) cycle that may be shorter than an idle state DRX cycle. Additionally or alternatively, the semi-connected state may be associated with a suppression of various communication functions, such as a suppression of monitoring of a physical downlink control channel according to at least one temporary network identifier by the UE, suppression of monitoring of a user-specific search space in the physical downlink control channel, suppression of reporting of channel state information by the UE, or suppression of availability of uplink control information resources for the UE. In various examples, context and logical traffic connections for control plane and user plane data for UEs in the semi-connected state may be maintained at the base station such that the context and logical traffic connections do not need to be re-established when the next data transfer occurs.

Whether to use semi-connected state operation for specific UEs may be based on UE characteristics (e.g., capabilities, priority, etc.), characteristics of logical traffic connections of the UE, or conditions such as loading at the base station. For example, whether a UE is eligible for semi-connected state operation may depend on whether the UE supports semi-connected state operation, UE priority compared with other UEs served by the base station, or a data traffic type or an access point name (APN) (e.g., address of a gateway for a network connection, etc.) associated with logical traffic connections. In some examples, UEs having data traffic types or APNs associated with low latency data service may be prioritized for semi-connected state operation. After determining eligibility and/or priority of UEs for semi-connected state operation, a base station may move UEs from the connected state to the semi-connected state based on inactivity timers, which may be shorter than a typical inactivity timer for transitioning UEs to the idle state. Additionally or alternatively, a base station may move UEs from the connected state to the semi-connected state based on any one or more of a traffic condition (e.g., an overload condition) or an indication from a serving gateway.

In the semi-connected state, the UE may continue to be served by the base station, and the base station may perform validation paging to determine if the UE is still in the coverage area of the base station. In some examples, a base station may move UEs from the semi-connected state to the idle state after expiration of a timer, which may be longer than the typical inactivity timer for transitioning UEs from the connected state to the idle state. Additionally or alternatively, a base station may move UEs from the semi-connected state to the idle state based on an overload condition or characteristics of logical traffic connections of the UEs.

In some examples the base station may receive an access request from the UE while the UE is in the semi-connected state, and the base station may associate a maintained context for the UE with the UE for connected-state operation, and indicate to the UE that it should transition to the connected state. In various examples, operation in a semi-connected state operation may reduce latency associated with a transition to a connected state in intermittent communications, and may reduce power consumption through reducing the amount of time that UEs are in the connected state.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with aspects of the present disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). Each of the base stations 105 may be configured to communicate using one or more communication technologies, and there may be overlapping geographic coverage areas 110 for different technologies.

In some examples, the wireless communications system 100 is an LTE/LTE-A network. In LTE/LTE-A networks, the term evolved Node B (eNB) may be used to describe the base stations 105, while the term UE may be used to describe various wireless communication devices that operate on the LTE/LTE-A network. The wireless communications system 100 may be a Heterogeneous LTE/LTE-A network in which different types of base stations 105 provide coverage for various geographical regions. For example, each base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with a network provider. A femto cell also may cover a relatively small geographic area (e.g., a home) and may provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. A base station may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Communication networks that may accommodate various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, non-access stratum (NAS) signaling is used to convey signaling between a UE and a mobility management entity (MME) for system access. The Radio Resource Control (RRC) protocol layer may provide establishment, configuration, and maintenance of an RRC connection between a UE 115 and the base stations 105 or core network 130 supporting radio bearers for the control plane and user plane data. At the physical (PHY) layer, the transport channels may be mapped to physical channels such as a physical downlink control channel (PDCCH) or physical downlink shared channel (PDSCH).

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro base stations, small cell base stations, relay base stations, and the like.

The communication links 125 shown in wireless communications system 100 may include uplink (UL) transmissions from a UE 115 to a base station 105, and/or downlink (DL) transmissions from a base station 105 to a UE 115. The downlink transmissions may be referred to as forward link transmissions and the uplink transmissions may be referred to as reverse link transmissions. The communication links 125 may transmit bidirectional communications using frequency division duplexing (FDD) operation (e.g., using paired spectrum resources) or time division duplexing (TDD) operation (e.g., using unpaired spectrum resources). Each communication link 125 may include one or more carriers, where each carrier may span a different frequency range and define a channel structure for modulation of information conveyed on the UL, DL, or both UL and DL over the frequency range. For example, each carrier may include one or more formatting channels, one or more control channels, one or more indicator channels, one or more data channels, and the like. Each carrier may have a designated channel number (e.g., E-UTRA Absolute Radio Frequency Channel Number (EARFCN), etc.) based on a relationship between the channel number and the carrier frequency within an operating band.

LTE/LTE-A utilizes multi-carrier modulation (MCM) techniques including orthogonal frequency-division multiple access (OFDMA) on the downlink and single-carrier frequency division multiple-access (SC-FDMA) on the uplink. Each MCM carrier is a waveform signal made up of multiple sub-carriers (e.g., orthogonal sub-carriers, etc.), which may be referred to as tones, bins, or the like. Each sub-carrier may be modulated with information (e.g., reference signals, control information, overhead information, user data, etc.). The spacing between adjacent sub-carriers may be fixed, and the total number of sub-carriers (K) may be dependent on the carrier bandwidth. For example, K may be equal to 72, 180, 300, 600, 900, or 1200 with a sub-carrier spacing of 15 kilohertz (KHz) for a corresponding carrier bandwidth (with guardband) of 1.4, 3, 5, 10, 15, or 20 megahertz (MHz), respectively. The carrier bandwidth may be partitioned into sub-bands. For example, a sub-band may cover 1.08 MHz, and a carrier may have 1, 2, 4, 8 or 16 sub-bands.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may be configured to operate on multi-path environments to transmit multiple spatial layers carrying the same or different coded data.

Wireless communications system 100 may support operation on multiple cells or carriers, a feature which may be referred to as carrier aggregation (CA) or multi-carrier operation. The term component carrier (CC) may refer to each of the multiple carriers utilized by a UE in CA operation, and may be distinct from other portions (e.g., other carriers, etc.) of system bandwidth. In CA operation, a UE 115 may be configured to utilize multiple downlink and/or uplink CCs concurrently to provide greater operational bandwidth, which may support higher data rates. CCs used in CA operation may be any suitable bandwidth (e.g., 1.4, 3, 5, 10, 15, or 20 megahertz (MHz), etc.), and in some examples each individual CC may provide the same capabilities as a single carrier (e.g., a single carrier based on Release 8 or Release 9 of the LTE standard). Thus, individual CCs may be backwards compatible with legacy UEs 115 (e.g., UEs 115 implementing LTE Release 8 or Release 9), while also being utilized by other UEs 115 (e.g., UEs 115 implementing LTE versions after Release 8 or Release 9) configured for CA or in single carrier mode. Alternatively, a CC may be configured to be used in combination with other CCs and may not carry some channels used to support single carrier mode (e.g., format or control channels, etc.). In various examples, CA may be used with both FDD and TDD component carriers.

Figure 2:
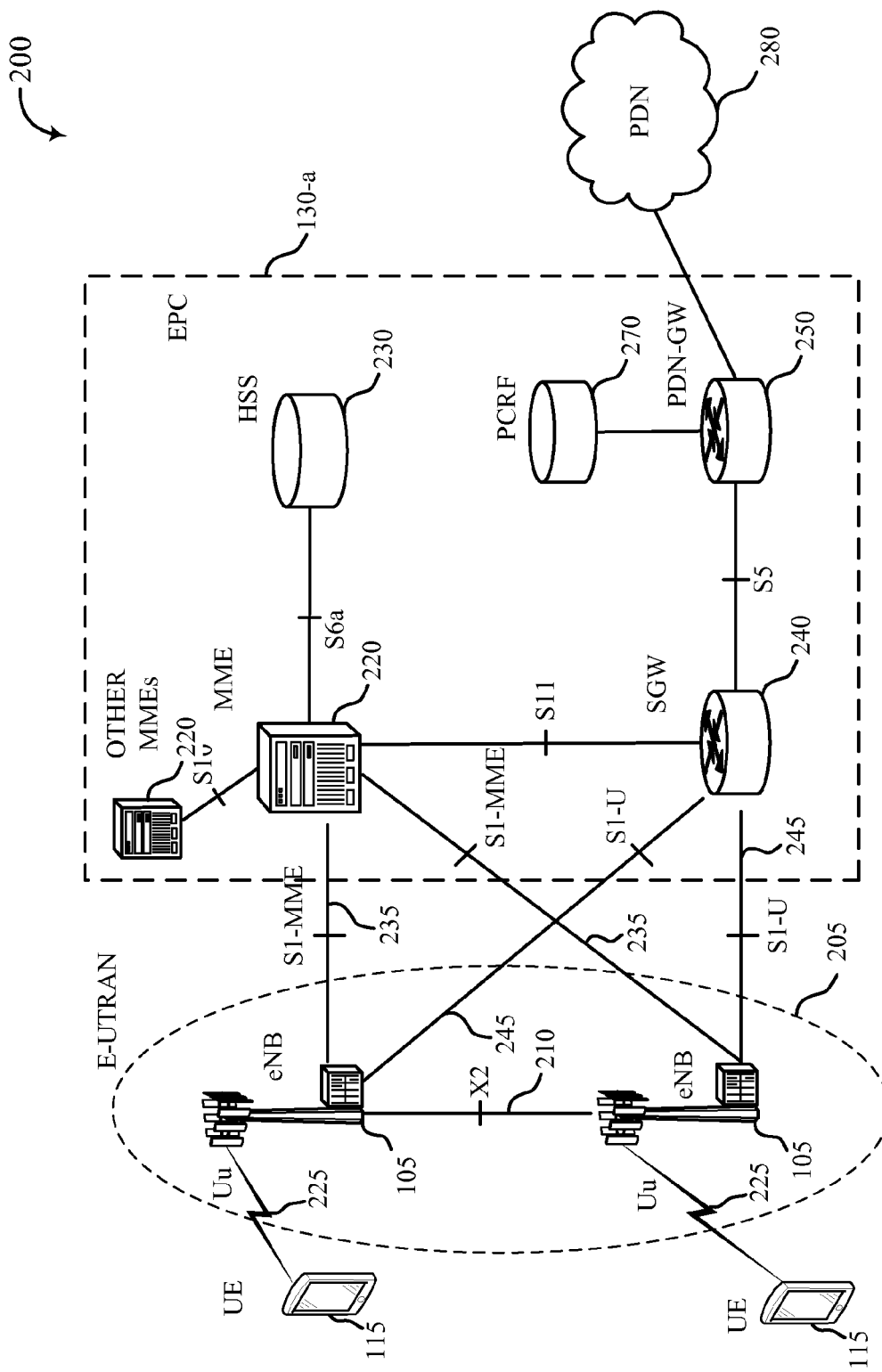
FIG. 2 is a diagram illustrating a system having an LTE/LTE-Advanced network architecture in accordance with aspects of the disclosure.

FIG. 2 is a diagram illustrating a wireless communications system 200 having an LTE/LTE-Advanced network architecture in accordance with aspects of the present disclosure. The LTE/LTE-A network architecture may be referred to as an Evolved Packet System (EPS). The EPS may include an Evolved Universal Mobile Telecommunication System (UMTS) Terrestrial Radio Access Network (E-UTRAN) 205 and an Evolved Packet Core (EPC) core network 130-*a*, providing network access services to one or more UEs 115. The EPS may connect to various packet data networks (PDNs) 280, which may include one or more Intranets, the Internet, an IP Multimedia Subsystem (IMS), or a Packet-Switched (PS) Streaming Service (PSS). The EPS may interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The core network 130-*a* may include one or more Mobility Management Entities (MMEs) 220, Serving Gateways (SGWs) 240, Home Subscriber Servers (HSSs) 230, Policy and Charging Rules Function (PCRF) 270, and Packet Data Network Gateways (PDN-GWs) 250. The MME 220 may be the control node that processes the control-plane signaling between the UEs 115 and the core network 130-*a*. Generally, the MME 220 may provide bearer and connection management. The HSS 230 may store subscription information for UEs 115 associated with the network. The HSS 230 may perform authentication and authorization for services provided to UEs 115 via the network. All user IP packets may be transferred through the S-GW 240, which itself may be connected to the PDN-GW 250. The PDN-GW 250 may provide UE IP address allocation as well as other functions. The PDN-GW 250 may be connected to one or more PDNs 280. The PCRF 270 may provide data session management and appropriate interfaces for charging and billing systems.

The E-UTRAN 205 includes base stations 105 and is structured according to a flat architecture, where base stations 105 operate without a separate Radio Network Controller (RNC) or Base Station Controller (BSC). Thus, each base station 105 provides user plane and control plane terminations for the air interface 225 between the base stations 105 and the UEs 115 known as the Uu interface.

The base stations 105 may be connected to each other via X2 interface 210. The base stations 105 may be connected to one or more MMEs 220 via S1-MME interfaces 235. The base stations 105 may be connected to one or more S-GWs 240 via S1-U interfaces 245. The S1-MME interfaces 235 and S1-U interfaces 245 may be Internet Protocol (IP) interfaces and may include both physical and logical interfaces. For example, portions of the S1-MME interfaces 235 and S1-U interfaces 245 may be implemented over the same physical connection, which also may be shared with portions of the X2 interfaces 210.

Communication over the air interface 225 is controlled according to an RRC protocol layer. The functions of the RRC protocol layer include broadcasting of system information, RRC connection control, paging, inter-RAT mobility, measurement configuration and reporting, transfer of capability and support for other radio technologies, error handling, and the like. A UE 115 is considered to be connected for communication via the E-UTRAN 205 when an RRC connection has been established with a base station 105. If no RRC connection is established, the UE 115 is considered to not be connected.

Once a UE 115 has established an RRC connection with a base station 105, it can be considered to be served by the base station 105 even when the RRC connection is released. The UE 115 may continue to be served by the base station 105 until the UE 115 performs a base station reselection process, the base station 105 or the UE 115 triggers a handover to another base station 105, the UE 115 experiences a radio link failure condition with the base station 105, or some other condition that triggers a disconnection from the network. When the UE 115 is served by a base station 105, communications between the UE 115 and the core network 130-*a* are expected to be routed via the base station 105. For example, a UE 115 served by a first base station 105 but not in the connected state expects to receive paging from the first base station 105 and to re-establish the RRC connection with the first base station 105 upon being paged or if the UE has MO data to send. Even though the UE 115 remains served by the first base station 105, in various examples paging may be received from a different base station (e.g., a second base station 105 in the same tracking area), and the UE 115 may switch to being served by the second base station 105 upon receiving the paging message. Thus, the UE 115 can still be served by a base station 105 while transitioning between various EPS connection management (ECM) states.

Generally ECM states defined for the UEs 115 may follow from the RRC connection status. A UE 115 may be considered to be in an idle state (e.g., RRC_IDLE) when no RRC connection is established. In the idle state, the UE 115 may monitor system information, perform neighbor cell measurements and cell selection/reselection, and the like. Thus, mobility in the idle state may be UE controlled. In the idle state, the UE 115 may monitor a paging channel according to a discontinuous reception (DRX) cycle but does not monitor control channels associated with shared data channels and thus the base station 105 does not schedule uplink or downlink data transmissions for UEs 115 in the idle state over the air interface 225.

When the UE 115 has an RRC connection, it is considered to be in a connected state (e.g., RRC_CONNECTED). When in the connected state, the UE 115 monitors system information, provides channel feedback, performs neighbor cell measurements and measurement reporting, and the like. In addition, the UE monitors control channels (e.g., PDCCH) associated with the shared data channel (e.g., PDSCH) to determine if it has data scheduled for it and may transmit a scheduling request on allocated resources if it has data to send. In the connected state, the UE 115 may also monitor a paging channel, which may be used to trigger an update of system information such as mobile alert information.

Movement between the idle state and connected state may be controlled by procedures for setting up an RRC connection. For example, a UE may perform a random access procedure for setting up an RRC connection, which may be triggered by receipt of a paging message for the UE 115 or by data present at the UE 115 to communicate via the base station 105. For a UE 115 in the connected state, the base station 105 may move the UE 115 to the idle state after a certain time has passed with no data activity. The inactivity timer for moving UEs 115 from the connected state to the idle state may typically be set in the range of 10 to 30 seconds.

Figure 3:
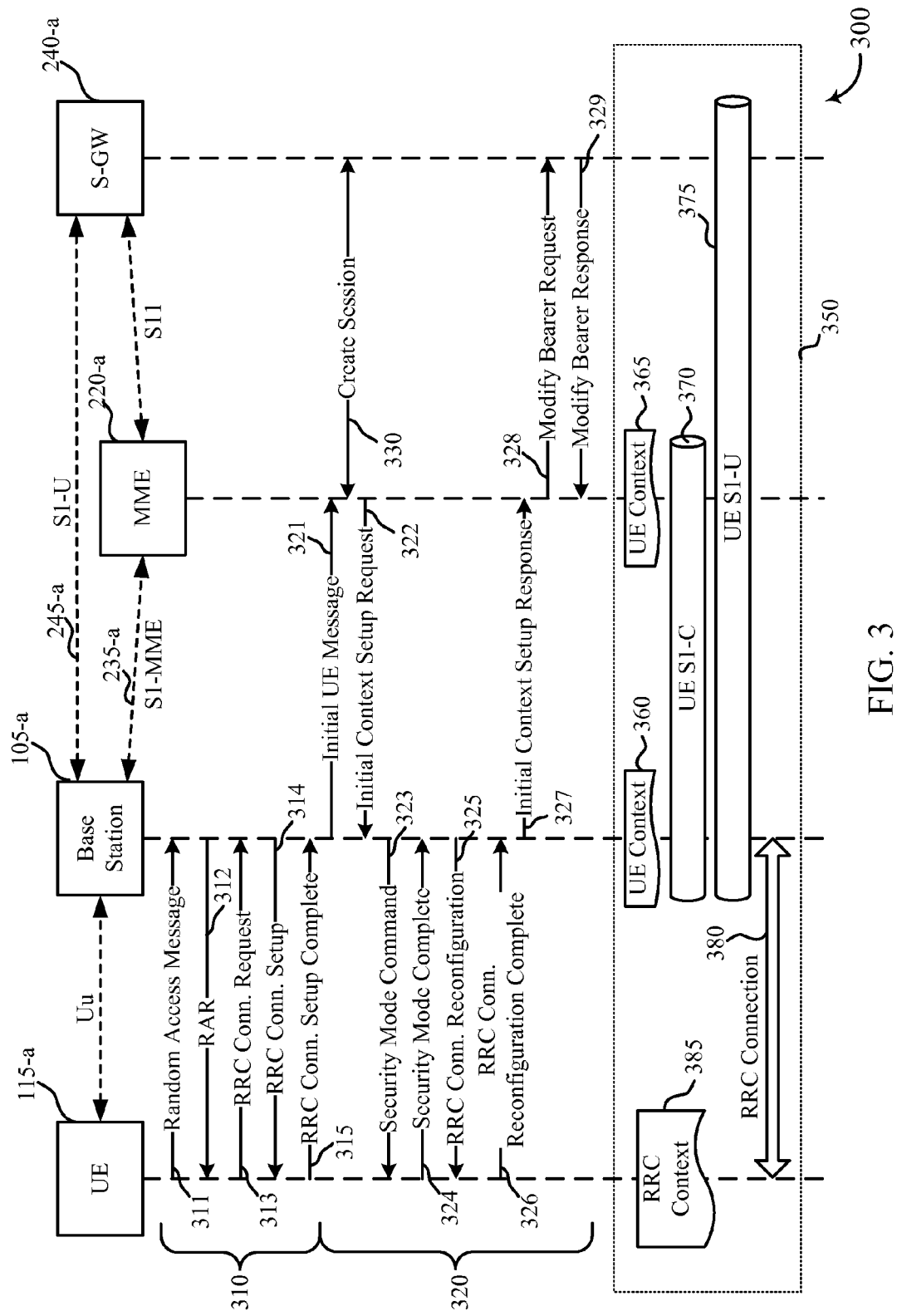
FIG. 3 shows a flow diagram of an example RRC connection procedure in accordance with aspects of the present disclosure.

FIG. 3 shows a flow diagram 300 of an example RRC connection procedure in accordance with aspects of the present disclosure. Flow diagram 300 illustrates the signaling for a UE 115-a to transition from idle mode to connected mode. Flow diagram 300 may be used to establish an RRC connection for either mobile originated (MO) or mobile terminated (MT) data. The example RRC connection procedure involves a RRC connection setup procedure 310 and a dedicated radio bearer setup procedure 320.

The RRC connection setup procedure 310 is initiated by the UE 115-a but can be triggered by either the UE 115-a for MO data or by the network for MT data (e.g., via a paging message, etc.). For example, the UE 115-a may trigger the RRC connection setup procedure 310 when the user starts an application that sends data to a remote IP address or initiates a voice call. RRC connection setup procedure 310 includes a random access message 311 sent by the UE 115-a to a base station 105-a over a random access channel (RACH). The base station 105-a responds with a random access response (RAR) 312 assigning resources for layer 3 messaging including the RRC connection request 313. The base station 105-a then sends an RRC connection setup message 314 and the UE 115-a responds with an RRC connection complete message 315.

When the UE 115-a has completed at least the RRC connection setup procedure 310, the UE 115-a is considered to be served by the base station 105-a for communication with the core network 130 (e.g., configured such that communications between the UE 115-a and the core network 130-a are to be routed via the base station 105-a). In various examples, the UE 115-a may continue to be served by the base station 105-a until the UE 115-a performs a base station reselection process, the base station 105-a or the UE 115-a triggers a handover to another base station 105, the UE 115-a experiences a radio link failure condition with the base station 105-a, or some other condition that triggers a disconnection from the network. Thus, the UE 115 can still be served by a base station 105 while transitioning between various ECM states.

If the base station 105-a is connected to multiple MMEs 220, the base station selects a suitable MME 220-a for the UE and performs authentication of the UE 115-a (e.g., via the HSS, etc.). The base station 105-a then initiates the dedicated radio bearer setup procedure 320, which may include sending an initial UE message 321 (e.g., attach message), which may include an NAS security key and registers the UE 115-a for services. The MME 220-a may exchange messaging 330 with the S-GW 240-a to create a session for the UE. The MME 220-a may then complete authentication and NAS security setup (e.g., assigning NAS keys, etc.). The MME 220-a then responds with initial context setup request message 322, which may include UE identification information, NAS security information, tracking area information (e.g., set of tracking areas which the UE is registered within, etc.), and the like. The base station 105-a performs security authentication for the UE 115-a including sending a security mode command 323 and receiving a security mode complete message 324. The base station 105-a sends an RRC connection reconfiguration message 325, which may include identification information for the UE (e.g., cell radio network temporary identifier (C-RNTI), etc.), radio resource information, and information for communication by the UE via bearers of the session. The UE acknowledges the RRC reconfiguration with RRC connection reconfiguration complete message 326.

The base station 105-a completes the dedicated radio bearer setup procedure 320 by sending an initial context setup response message 327 to the MME 220-a. The initial context setup response message 327 may include quality of service (QoS) information and identifiers for logical connections associated with the UE 115-a (e.g., eNB and MME S1 application protocol identities (AP IDs), tunnel endpoint identifier (TEID), etc.). The MME 220-a may send a modify bearer request 328 to the S-GW 240-a, which provides the S-GW 240-a with the downlink transport layer address and TEID. The S-GW 240-a may respond with an acknowledgement in a modify bearer response message 329.

If the RRC connection setup procedure 310 and dedicated radio bearer setup procedure 320 are successful, the UE 115-a moves to the connected state 350. Dedicated radio bearer setup procedure 320 establishes logical connection S1-C 370 for the UE 115-a over the S1-MME interface 235-a. The logical connection S1-C 370 is used to carry control-plane information specific to UE 115-a identified by the eNB and MME S1 AP IDs. Dedicated radio bearer setup procedure 320 also establishes logical connection S1-U 375 for the UE 115-a over the S1-U interface 245-a. Logical connection S1-U 375 is used to carry user-plane data for UE 115-a, identified by the TEID, between base station 105-a and S-GW 240-a.

Dedicated radio bearer setup procedure 320 also establishes UE context 360 at the base station 105-a, and UE context 365 at the MME 220-a. UE contexts 360 and 365 include information for maintaining services for the UE 115-a. For example, UE contexts 360 and 365 may include UE state information, UE security information, UE capability information, a radio resource control (RRC) configuration for the UE, an identity associated with a logical traffic connection for the UE (e.g., S1 AP IDs, TEID, etc.), or any combination thereof. The UE context 360 at the base station 105-a allows the base station 105-a to route data and control plane information for the UE 115-a over the S1-C 370 and S1-U 375 logical connections.

Depending on network loading and other factors, the RRC connection setup procedure 310 may take 30-60 ms, while dedicated radio bearer setup procedure 320 may take on the order of 100 ms. For many types of mobile applications, these procedures may introduce noticeable latency in intermittent communications. For example, in messaging, gaming, and other applications, data may be intermittent but latency on the order of 100 ms may cause a noticeable degradation in performance. However, mobile devices also are constrained in power usage, and reducing the amount of time that UEs 115 enable their receiver to monitor for communications from a base station 105 is an important factor in reducing power usage at the UEs 115. Thus, reducing latency for intermittent communications while operating under a limited power budget creates challenges in multiple access systems such as LTE/LTE-A systems.

According to described aspects, the components of the wireless communications systems 100 and 200, including the UEs 115, base stations 105, MMEs 220, or S-GWs 240, may be configured for operation of the UEs 115 in a semi-connected state. In the semi-connected state, the UE 115 may control mobility and monitor system information and paging, while maintaining RRC context information to reduce latency in re-establishing an RRC connection. A base station 105 may manage state transitions for UEs 115 that are camped on, served by, and/or otherwise connected to the base station 105, and may determine whether to transition specific UEs 115 that are currently in the connected state to the semi-connected state or the idle state when inactivity is detected. For UEs 115 that are in the semi-connected state and still being served by the base station 105, the base station 105 may maintain context information and in some examples additionally maintain established logical traffic connections. In examples where the context and logical traffic connections are maintained, when a transition from the semi-connected state to the connected state occurs for a UE, the base station 105 does not have to re-establish security mode parameters, nor re-establish logical traffic connections within the network for carrying control plane and user plane data for the UE.

Whether to transition a specific UE 115 from the connected state to the semi-connected state may be based on capabilities, priority, or characteristics of logical traffic connections of the UE. Characteristics of logical traffic connections may include, for example, a data traffic type or APN associated with the logical traffic connections. Additionally or alternatively, the base station 105 may transition a UE 115 from the connected state to the semi-connected state based on conditions such as loading at the base station 105 or an inactivity timer, which may be shorter than a typical inactivity timer for transitioning UEs 115 to the idle state. In some examples the base station 105 may move a UE 115 from the connected state to the semi-connected state based on characteristics of logical traffic connections of the UE, a data traffic condition (e.g., overload condition, address space condition, etc.), or an indication from a S-GW.

In some examples, the base station 105 may start an inactivity timer upon moving a UE 115 from a connected to a semi-connected state. If the inactivity timer expires before the UE 115 transitions back to the connected state (e.g., as a result of MT or MO data, etc.), the base station 105 may move the UE 115 from the semi-connected state to the idle state. In some examples, the inactivity timer may be longer than the typical inactivity timer for transitioning UEs 115 from the connected state to the idle state. In some examples the base station 105 may move UEs 115 from the semi-connected state to the idle state based on an overload condition or characteristics of data connections of the UEs 115.

In some examples, the base station may receive an access request from the UE while the UE is in the semi-connected state, and the base station may associate a maintained context for the UE with the UE for connected-state operation, and indicate to the UE that it should transition to the connected state. In various examples, operation in a semi-connected state operation may reduce latency associated with a transition to a connected state in intermittent communications, and may reduce power consumption through reducing the amount of time that UEs are in the connected state.

Figure 4:
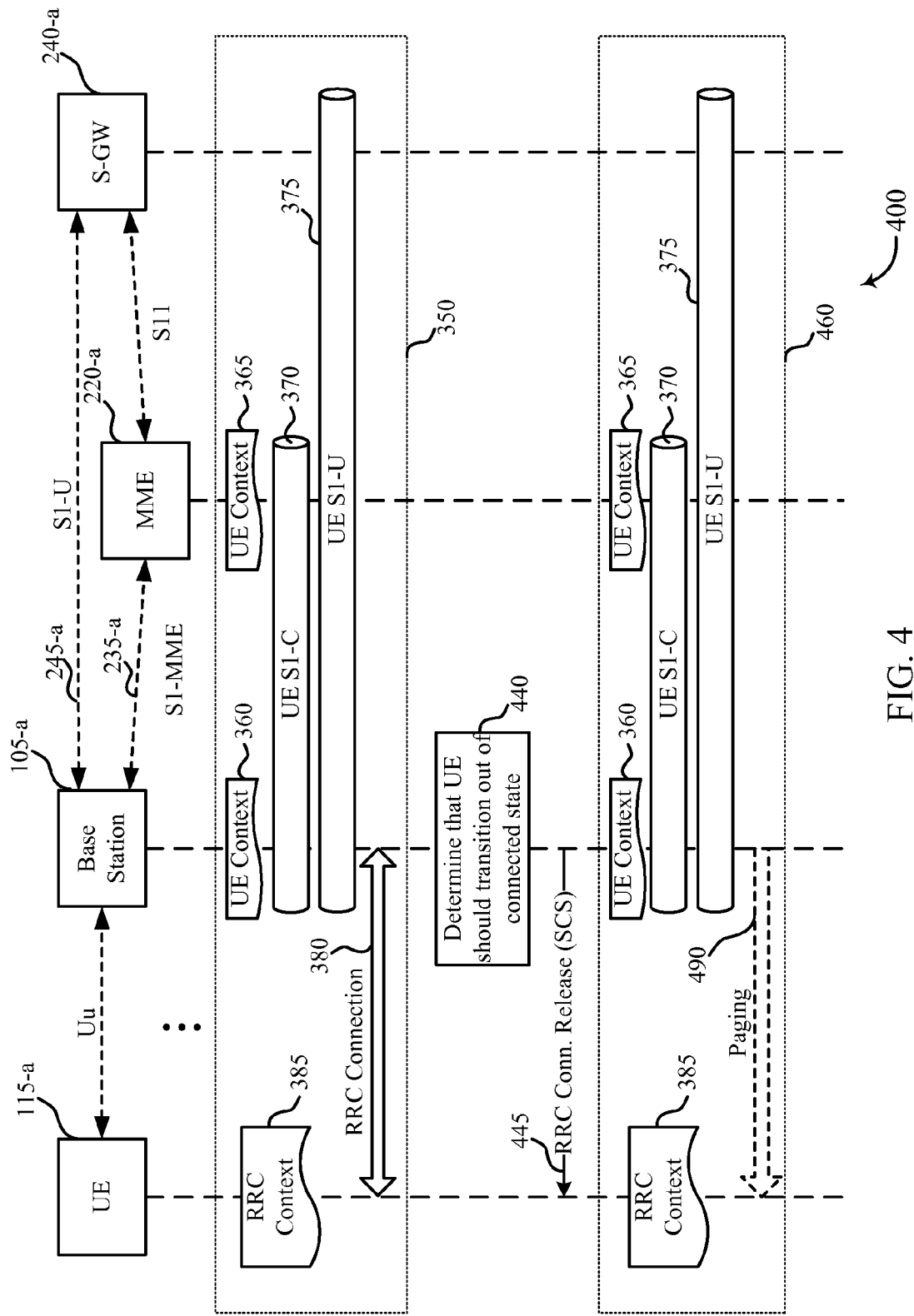
FIG. 4 shows a flow diagram of an example procedure for semi-connected state operation in accordance with aspects of the present disclosure.

FIG. 4 shows a flow diagram 400 of an example procedure for semi-connected state operation in accordance with aspects of the present disclosure. Flow diagram 400 may illustrate, for example, semi-connected state operation for UEs 115 in the wireless communications systems 100 or 200 described with reference to FIG. 1 or 2.

In flow diagram 400, UE 115-a starts in connected state 350 with base station 105-a, where the UE 115-a monitors a downlink control channel (e.g., PDCCH, etc.) and may exchange data with the base station 105-a over RRC connection 380.

The base station 105-a may classify connected UEs 115 for state operation based on various factors including a UE identity, a UE capability indicator, a UE configuration, UE priority information, UE data traffic history, UE connection history, characteristics of a logical connection of the UE 115-a (e.g., a packet data network identifier, APN, data traffic type, etc.), a loading condition of the base station, and the like. For example, the base station 105-a may determine that some UEs 115 are configured for low-latency operation or are using applications that have intermittent traffic and are sensitive to latency in communications. Thus, the base station 105-a may classify some connected UEs 115 to use semi-connected state operation while other UEs 115 may be classified for legacy state operation without semi-connected state operation. The base station 105-a may apply different connected state inactivity timers to UEs 115 that are classified for semi-connected state operation and those UEs 115 that are classified for legacy state operation. For example, UEs 115 classified for semi-connected state operation may have an associated connected state inactivity timer that is shorter than the connected state inactivity timers for UEs classified for legacy state operation.

The base station 105-a may determine at block 440 that the UE 115-a should transition out of the connected state. For example, the UE 115-a may be classified for semi-connected state operation and the base station 105-a may determine that the connected state inactivity timer for the UE 115-a has expired. Additionally or alternatively, the base station 105-a may move the UE 115-a out of the connected state based on data traffic conditions (e.g., high loading at the base station 105-a, etc.) or an indication from the S-GW 240-a that the UE 115 is no longer actively using a session. Thus, the base station 105-a may determine that the UE 115-a should transition from the connected state to the semi-connected state.

The base station 105-a may send a message (e.g., RRC Connection Release) 445 to the UE 115-a and may indicate in the message 445 that the UE 115-a is to transition to the semi-connected state (SCS) 460. When the UE 115-a is in the semi-connected state 460, the base station 105-a may maintain UE context 360, and in some examples maintain the logical traffic connections (e.g., S1-C 370, S1-U 375, etc.) for the UE 115-a. The UE may maintain the RRC context 385, which may include information related to logical control channels, data channels, and security for communication over the RRC connection 380.

In the semi-connected state 460, the UE 115-a may monitor a paging channel 490 for paging messaging. The UE 115-a may monitor paging channel 490 according to a DRX cycle that may be different from a DRX cycle for the idle state. For example, the DRX cycle for UEs 115 in the semi-connected state may be a fraction of the DRX cycle for UEs in the idle state. Thus, for a UE 115 configured for a particular idle-state DRX cycle (e.g., 32, 64, 128 or 256 frames, etc.), the semi-connected state DRX cycle may be the idle-state DRX cycle divided by a DRX cycle divisor (e.g., 2, 4, 8, etc.). Additionally or alternatively, the base station 105-*a* may broadcast a default semi-connected state DRX cycle. In addition, UEs 115 may negotiate a different semi-connected state DRX cycle or DRX cycle divisor with the base station 105-*a*.

Additionally or alternatively, the semi-connected state may be associated with a suppression of one or more communication functions, such as a suppression of a monitoring of a physical downlink control channel according to a user-specific network identifier (e.g., C-RNTI, SPS-RNTI, etc.) by a UE 115, a suppression of monitoring of a user-specific search space in the physical downlink control channel, suppression of reporting of CSI by the UE, suppression of availability of uplink control information resources for the UE, or suppression of availability of reference signal (e.g., SRS, etc.) transmission resources on a shared physical uplink data channel.

Figure 5:
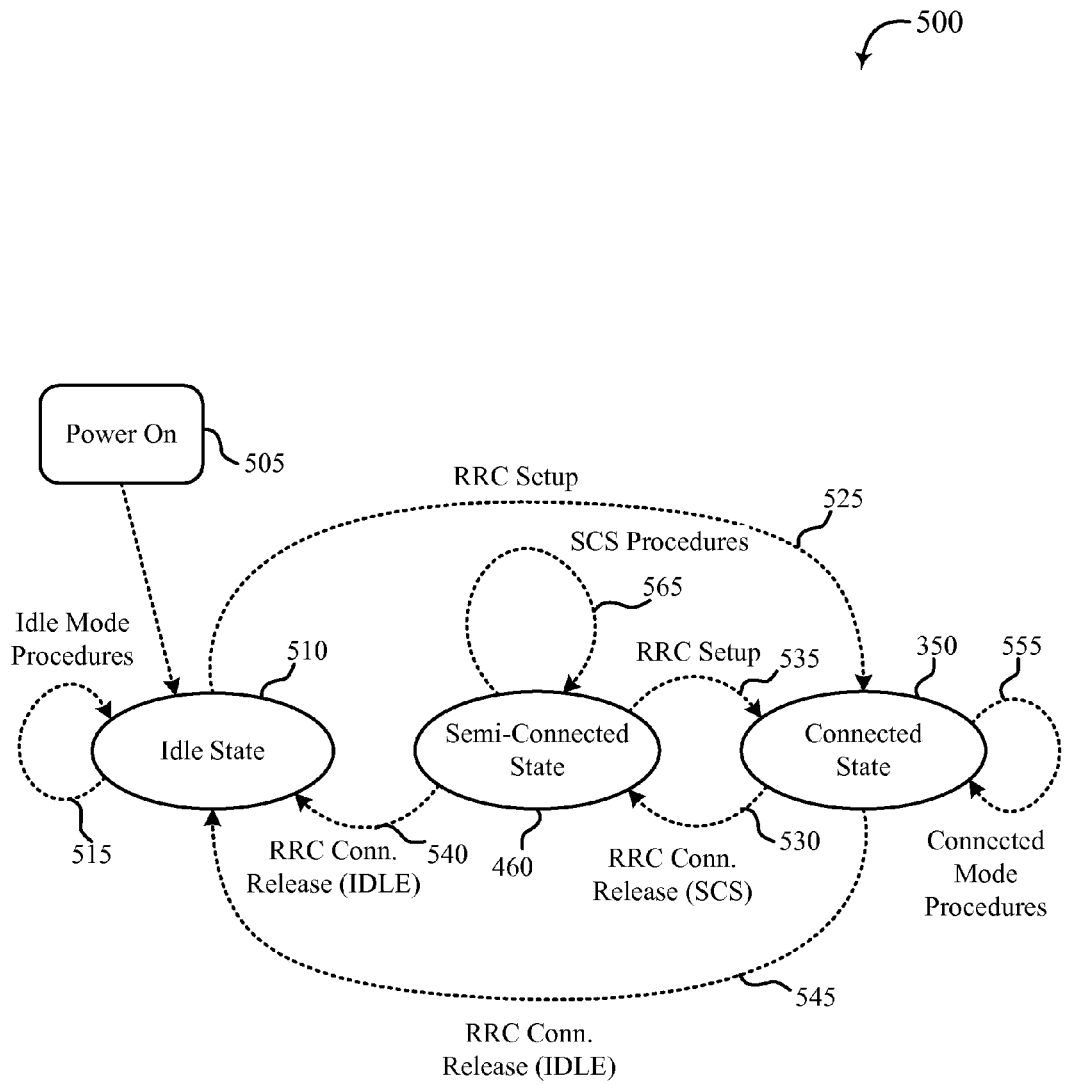
FIG. 5 shows an example state diagram of mode transitions for UEs using semi-connected state operation in accordance with aspects of the present disclosure.

FIG. 5 shows an example state diagram 500 of mode transitions for UEs 115 using semi-connected state operation in accordance with aspects of the present disclosure. State diagram 500 may illustrate, for example, semi-connected state operation for UEs 115 in the wireless communications systems 100 or 200 described with reference to FIG. 1 or 2.

At power-on 505, the UE 115 may begin in the idle state 510. The UE 115 may perform idle state procedures 515 in the idle state 510, which may include monitoring system information, performing neighbor cell measurements and cell selection/reselection, and the like. The UE 115 may perform RRC setup procedure 525 to transition to the connected state 350. RRC setup procedure 525 may be performed after power-on or may be triggered by the presence of MO or MT data for transmission. RRC setup procedure 525 may include, for example, performing a random access procedure for setting up an RRC connection. Transitioning the UE 115 to the connected state includes establishing UE contexts at the base station 105 and MME 220. In addition, UE-specific logical traffic connections are set up for the UE 115 between the base station 105 and the MME 220 (e.g., S1-C logical connection) and between the base station 105 and the S-GW 240 (e.g., S1-U logical connection).

In the connected state 350, the UE 115 performs connected state procedures 555. Connected state procedures 555 may include, for example, monitoring system information, performing neighbor cell measurements, sending reference signals (e.g., SRS, etc.) upon request, sending and receiving control-plane signaling (e.g., providing channel feedback and neighbor measurement reporting, monitoring control channels to determine if it has data scheduled for it, transmitting a scheduling request on allocated resources if it has data to send, etc.), and sending and receiving user-plane data (e.g., transmitting and receiving coded data packets, etc.).

In some examples, connected state procedures 555 may include connected state DRX (c-DRX) operation. Connected state DRX operation includes on and off reception periods that are performed according to a connected state DRX cycle. In connected state DRX operation, the UE 115 enables its receiver for a specified on duration for each connected state DRX cycle and monitors PDCCH for both data-associated and non-data associated DCI. For example, the UE 115 may monitor one or user-specific search spaces and one or more common search spaces of the PDCCH, and may monitor according to non-user specific network identifiers (e.g., paging RNTI (PRTI), etc.) as well as user-specific network identifiers (e.g., C-RNTI, SPS-RNTI, etc.). The UE 115 may start in a short connected state DRX cycle and may transition to a long connected state DRX cycle after a period of inactivity. While connected state DRX operation saves power over non-DRX modes of operation, the UE 115 is still powered on for a significant percentage of frames or subframes and transmits some signaling such as a sounding reference signal (SRS) during the on-durations. Thus, the potential power savings using connected state DRX operation are limited. In addition, UEs 115 in connected state DRX are allocated uplink resources for some types of signaling (e.g., SR resources, SRS resources, Channel State Information (CSI) reporting resources, etc.), and thus the number of UEs 115 that may be supported in connected state DRX operation may be limited by the available physical resources.

According to some examples, the base station 105 can transition a UE 115 directly to the idle state 510 or to the semi-connected state 460 from the connected state 350. The base station 105 can determine, for UEs 115 in the connected state 350, whether the UE 115 will be classified to use semi-connected state operation or not. Determining whether to classify a UE for semi-connected state operation may be based on UE identity, UE capability, UE configuration, UE priority information, UE data traffic history, UE connection history, a packet data network (PDN) identifier associated with a data connection of the UE 115, a loading condition of the base station, and the like. For example, the base station 105 can evaluate various loading conditions such as usage of physical or logical resources of the base station 105 (e.g., memory, concurrent processes, address space, etc.). In some cases, the base station 105 may order connected state UEs 115 with the capability of operating in semi-connected state according to priority information, data traffic history, PDN identifiers (e.g., access point name (APN), etc.) and the like. The base station 105 may classify those UEs 115 higher up in the order to use semi-connected state operation and may classify UEs lower in the order to use legacy state operation.

Based on classification of the UEs 115 in the connected state 350, the base station 105 may determine inactivity timers for the UEs 115. UEs 115 classified to use semi-connected state operation may be transitioned from the connected state 350 to the semi-connected state 460 at the expiration of the associated connected state inactivity timer. Additionally or alternatively, the base station 105 may move a UE 115 in the connected state out of the connected state based on data traffic conditions or an indication from the S-GW that the UE 115 is no longer actively using a session.

The base station 105 may send a message 530 (e.g., RRC Connection Release (SCS)) to the UE 115 to transition the UE 115 to the semi-connected state 460. In some examples, this may follow the base station 105 determining that the UE 115 has a capability of using the semi-connected state. The message 530 may additionally include a flag to indicate the state that the UE 115 should transition to (e.g., semi-connected). After the transition to the semi-connected state 460, the UE may still be served by the base station 105 (e.g., the UE 115 may still be configured such that communications between the UE 115 and a core network 130 are to be routed via the base station 105). In the semi-connected state 460, the base station 105 maintains the UE context and/or logical traffic connections established in the connected state 350.

If the base station 105 determines that the UE 115 either does not have the capability of using the semi-connected state (e.g., legacy UE), or should not be transitioned to the semi-connected state 460 for other reasons (e.g., low priority UE, low priority applications or traffic, cell or base station loading, etc.), the base station 105 can transition the UE 115 directly to the idle state 510 using message 545 (e.g., RRC Connection Release (IDLE) 545). The message 545 may additionally include a flag to indicate the state that the UE 115 should transition to (e.g., idle).

In the semi-connected state 460, the UE 115 may perform semi-connected state procedures 565. Semi-connected state procedures 565 may include performing mobility procedures (e.g., cell reselection, etc.), monitoring system information, monitoring a paging channel, and the like. Additionally or alternatively, the semi-connected state 460 may be associated with a suppression of various communication functions as compared to the connected state 350. For example, the UE may suppress monitoring for downlink control information in the PDCCH having cyclic redundancy check (CRC) bits scrambled with a user-specific network identifier (e.g., C-RNTI, SPS-RNTI, etc.) or may suppress monitoring for control information in the user-specific search space. The availability of uplink resources and uplink reporting of CSI may also be suppressed. That is, the UE may not be allocated resources on the PUCCH for SR and/or CSI or resources on PUSCH for SRS. The UE 115 may monitor for paging in the semi-connected state according to a DRX cycle that may be the same or different from a DRX cycle for the idle state 510, as discussed above. Monitoring for paging may be performed by monitoring the common search space during paging occasions according to the semi-connected state DRX cycle and according to a non-user specific network identifier (e.g., paging RNTI (P-RNTI), etc.).

If the UE 115 is in the semi-connected state 460 and the presence of MO or MT data is detected, a transition back to the connected state 350 is triggered. For example, if the UE 115 has MO data to send or receives a paging messaging indicating that there is MT data for the UE 115 at the base station 105 that the UE is being served by, the UE 115 performs RRC setup procedure 535. In some examples, RRC setup procedure 535 includes performing a random access procedure. The RRC setup procedure 535 may be generally the same procedure as RRC setup procedure 525, or may be different, in some cases. For example, RRC setup procedure 535 may be able to be performed with fewer messaging steps because the UE context information is maintained at the base station 105. For example, security information may not have to be re-established for the RRC connection for the UE 115.

The base station 105 that a UE 115 is being served by may transition a UE 115 from the semi-connected state 460 to the idle state 510 for a variety of reasons. For example, the base station 105 may start a timer upon the UE 115 entering the semi-connected state, and if the timer expires without a threshold level of data activity while the UE 115 still in the semi-connected state, the UE 115 may be transitioned to the idle state. Additionally or alternatively, the base station 105 may transition the UE 115 to the idle state if a data traffic or loading condition occurs at the base station 105, such as an overload condition. For example, if a large number of UEs 115 are in the connected or semi-connected states, it is possible for the base station 105 to run out of address space for the C-RNTIs assigned to the UEs 115. Other data traffic or loading conditions may occur based on memory or other constraints for maintaining a large number of UE contexts or logical traffic connections (e.g., S1-C and S1-U connections). In some examples, the base station 105 may transition one or more UEs 115 to the idle state based on one or both of a data traffic type or an APN. If a data traffic or loading condition occurs, the base station 105 may transition some semi-connected UEs to the idle state, in order of priority (e.g., UE priority, PDN connection priority, etc.), time elapsed in the semi-connected state, or combinations of priority and time elapsed. To transition the UE 115 to the idle state, the base station 105 may send a message 540 (e.g., RRC Connection Release).

Figure 6:
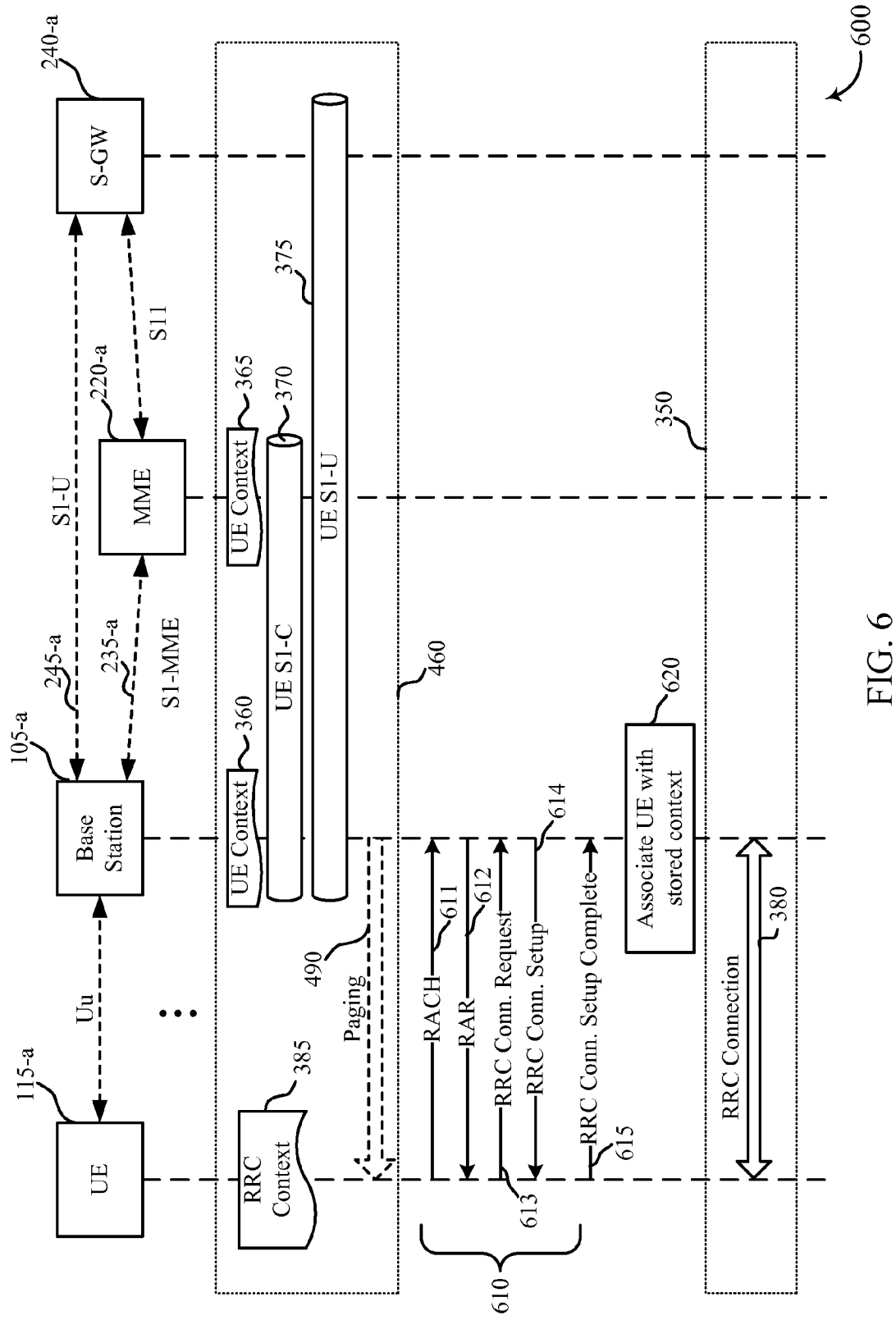
FIG. 6 shows a flow diagram of an example procedure for semi-connected state operation in accordance with aspects of the present disclosure.

FIG. 6 shows a flow diagram 600 of an example procedure for semi-connected state operation in accordance with aspects of the present disclosure. Flow diagram 600 may illustrate, for example, semi-connected state operation for UEs 115 in the wireless communications systems 100 or 200 described with reference to FIG. 1 or 2.

At the beginning of flow diagram 600, the UE 115-*a* may be in the semi-connected state 460 described with reference to FIG. 4 or 5. If the UE 115-*a* has MO data to send or receives paging messaging 490 indicating that there is MT data for the UE at the base station 105-*a* that the UE 115-*a* is being served by, the UE 115-*a* performs RRC setup procedure 610. RRC setup procedure 610 may include, for example, transmission of a random access preamble 611 on a RACH, receiving a random access response (RAR) 612, and an exchange of RRC connection messages such as RRC connection request 613, RRC connection setup 614, RRC connection setup complete 615. However, UE state information, UE security information, UE capability information, a radio resource control (RRC) configuration for the UE, or an identity associated with at least one logical traffic connection for the UE (e.g., C-RNTI, etc.) may be maintained in the semi-connected state 460. Thus, RRC setup procedure 610 may not need to include exchanging security mode commands or other information typically exchanged in RRC connection reconfiguration messaging. In some examples RRC setup procedure 610 may be completed in 20-60 ms (depending on cell loading), which may save approximately 50-100 ms or more from RRC setup from the idle state.

Various techniques may be used to further reduce the number of messages for RRC setup procedure 610. For example, a scheduling request (SR), buffer status report (BSR), or RRC connection request 613 may be included in random access preamble 611. In some cases, re-using synchronization (e.g., timing advance, etc.) from the previous connected state operation when transmitting random access preamble 611 may reduce the time for the RRC setup procedure 610 (e.g., in small cells or low mobility scenarios, etc.). Additionally or alternatively, UEs in semi-connected state may be able to send an SR to a base station the UE is being served by without a random access preamble. For example, UEs 115 in semi-connected state may be assigned SR resources of an uplink control channel (e.g., PUCCH). However, assigning SR resources at a base station for semi-connected state UEs 115 may limit the number of UEs 115 that can be in the semi-connected state at the same time while being served by the base station. In some examples, allocation of SR resources may be semi-statically performed for UEs in semi-connected mode (e.g., via paging messaging, etc.). In one example, UEs may be allocated SR resources upon initial transfer to the semi-connected state, and SR resources may be de-allocated upon expiration of a timer or via messaging (e.g., if the base station 105 detects a loading condition, etc.).

At block 620, the base station 105-*a* may associate the UE 115-*a* with the stored UE context 360 and logical connections established for the UE 115-*a* when in connected mode (e.g., S1-C 370, S1-U 375, etc.). Thus, the UE 115-*a* may be transitioned from the semi-connected state 460 to the connected state 350 without having to re-establish the UE context 360 at the base station 105-*a* that the UE 115-*a* is being served by, and in some examples without having to re-establish logical traffic connections for carrying control plane and user plane data over the S1 interfaces. Because security information is maintained in semi-connected state 460, RRC connection 380 may use the same eNB key (KeNB) and NAS security keys for communication between the UE 115 and MME 220 may also be maintained.

Figure 7:
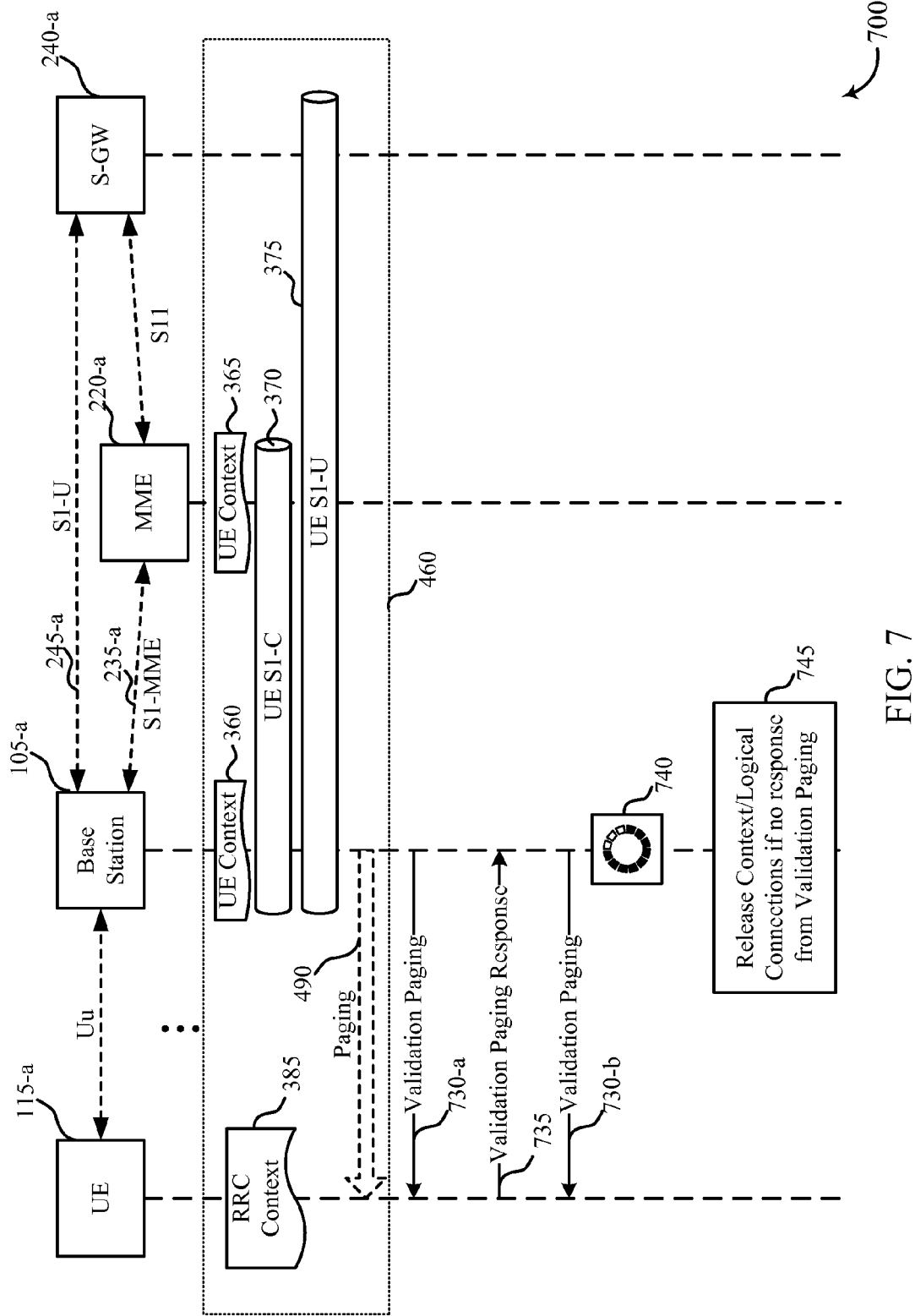
FIG. 7 shows a flow diagram of an example procedure for validation paging in semi-connected state operation in accordance with aspects of the present disclosure.

FIG. 7 shows a flow diagram 700 of an example procedure for validation paging in semi-connected state operation in accordance with aspects of the present disclosure. Flow diagram 700 may illustrate, for example, validation paging for semi-connected state operation for UEs 115 in the wireless communications systems 100 or 200 described with reference to FIG. 1 or 2.

At the beginning of flow diagram 700, the UE 115-a may be in the semi-connected state 460 described with reference to FIG. 4 or 5. While the UE 115-a is in the semi-connected state 460, the base station 105-a that the UE 115-a is being served by may periodically send validation paging messages 730 to the UE 115-a, which may be associated with a periodic validation interval. Validation paging messages 730 may be indicated by a paging message during a paging occasion for the UE 115-a that are masked with a predetermined validation paging RNTI (V-RNTI).

For a first validation paging message 730-a, the base station 105-a may receive validation paging response 735 from the UE 115-a. Validation paging response 735 may be, for example, a random access preamble indicating that the UE 115-a has received the validation paging message 730-a. The random access preamble may include information that indicates that the UE is responding to the validation paging message 730. For example, the random access preamble may be predetermined or an assigned preamble for responding to validation paging (e.g., non-contention preamble, etc.).

For a second validation paging message 730-b, the base station 105-b may not receive a validation paging response 735 from the UE 115-a before expiration of a timer 740. Based on not receiving a validation paging response 735, the base station 105-a may determine that the UE 115-a has moved out of the service area of the base station 105-a or has become otherwise unreachable. Thus, the base station 105-a may release the UE context 360 and/or logical traffic connections (e.g., S1-C 370, S1-U 375, etc.) at block 745. Because the UE 115-a may be able to receive validation paging messages 730 in cases where the base station 105-a is unable to receive the paging validation response, the base station 105-a may send an RRC connection release (not shown) indicating that the UE 115-a should transition to the idle state. This may help maintain state synchronization between the base station 105-a and UE 115-a. The UE 115-a may also maintain a timer and may transition from the semi-connected state to the idle state upon expiration of the timer without receiving a validation paging message 730. Even after transitioning to the idle state, the UE 115-a may still be served by the base station 105-a until the network has determined that the UE 115-a has reselected to a different base station or entered a new tracking area.

Figure 8:
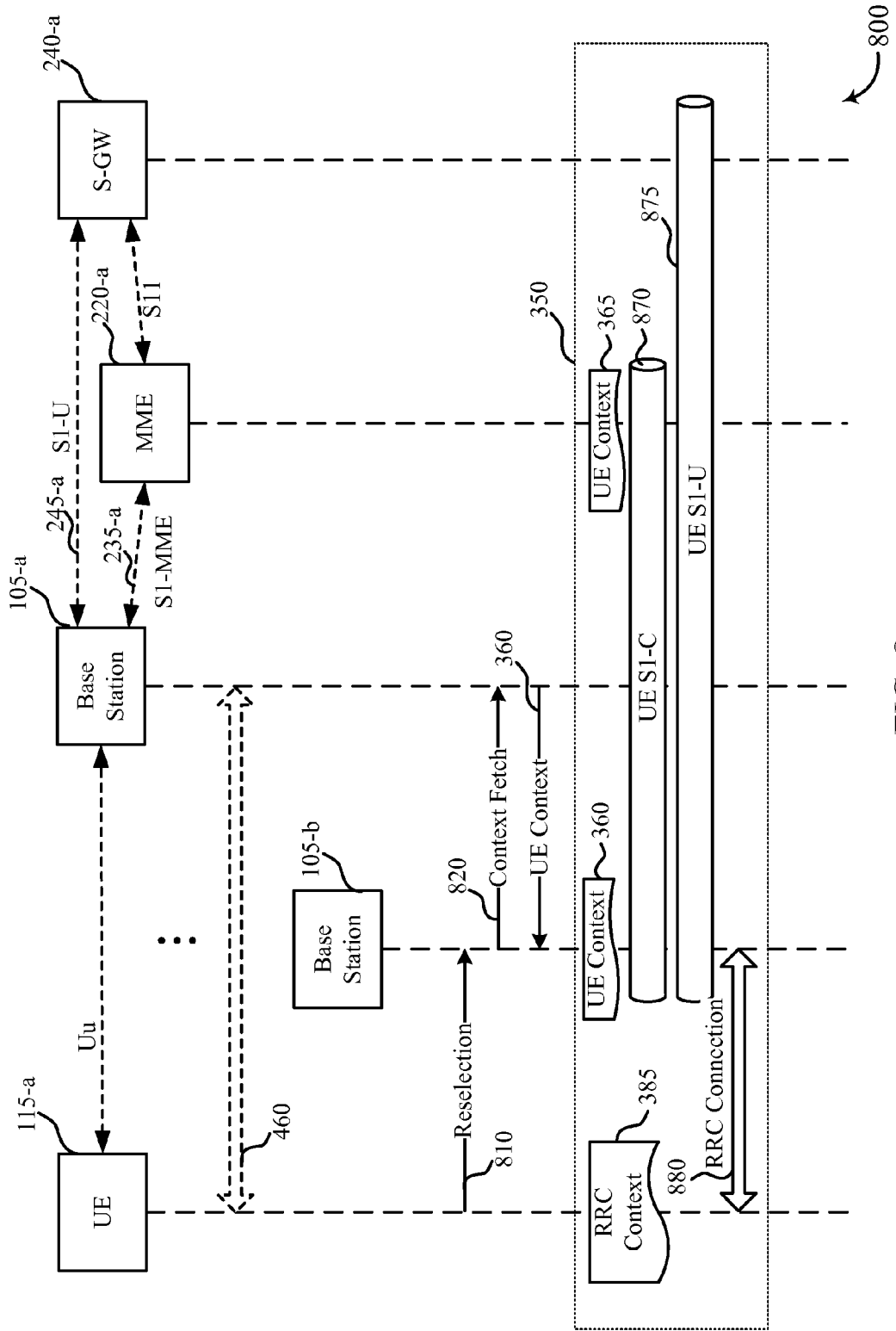
FIG. 8 shows a flow diagram of an example procedure for semi-connected state mobility in accordance with aspects of the present disclosure.

FIG. 8 shows a flow diagram 800 of an example procedure for semi-connected state mobility in accordance with aspects of the present disclosure. Flow diagram 800 may illustrate, for example, semi-connected state mobility for UEs 115 in the wireless communications systems 100 or 200 described with reference to FIG. 1 or 2, where mobility in the semi-connected state may be controlled by the UE 115s.

At the beginning of flow diagram 800, a UE 115-a may be served by base station 105-a, and may be in the semi-connected state 460 as described above with reference to FIG. 4 or 5. At some point, the UE 115-a may determine (e.g., based on neighbor cell measurements, etc.) that it should perform cell reselection to base station 105-b (e.g., transition from being served by the UE 115-a to being served by the base station 105-b). In some examples, the base station 105-b may be associated with one or more of a context area of the base station 105-a, a tracking area of the base station 105-a, a neighbor list of the base station 105-a, or a neighbor list of the UE 115-a. The UE 115-a may send cell reselection messaging 810 to base station 105-b, which may include, for example, a random access procedure and RRC connection setup messaging, such that the UE 115-a is then served by the base station 105-b. In cell reselection messaging 810, the UE 115-a may indicate the previous cell for which it had been connected to and/or served by.

Based on cell reselection messaging 810, the base station 105-b may send context fetch message 820 to base station 105-a to obtain the UE context 360 for UE 115-a. Context fetch message 820 may be, for example, a forward handover message or a context fetch only message. The base station 105-a may respond with the UE context 360 and base station 105-b may associate the UE context 360 with the UE 115-a for further connected-state or semi-connected state operations with the UE 115-a. For example, base station 105-b may establish a new RRC connection 880 with UE 115-a according to the UE context 360. The base station 105-b may establish logical traffic connections (e.g., S1-C 870, S1-U 875, etc.) for the UE 115-a. In some cases, base station 105-a may also transfer the S1 AP ID and TEID associated with the S1-C and S1-U logical traffic connections for the UE 115-a at base station 105-a to base station 105-b. The base station 105-b may then re-use the same S1 AP ID and TEID for logical traffic connections S1-C 870 and S1-U 875, respectively, unless not unique within the base station 105-b. Thus, the connected state 350 for UE 115-a may be established at the base station 105-b without the base station 105-b having to rebuild UE context 360.

In some examples, cell reselection messaging 810 may indicate that the cell reselection is a semi-connected state cell reselection (e.g., NAS reselection procedure). For example, UE 115-a may include an indicator (e.g., RRC establishment cause, an indicator of the UE state, etc.) in a connection request message (e.g., RRC connection request) as part of cell reselection messaging 810 which indicates a semi-connected state cell reselection. Additionally or alternatively, the base station 105-a may indicate when sending the UE context 360 to base station 105-b that the UE 115-a was in the semi-connected state with the base station 105-a prior to cell reselection. In various examples, a network entity may send an indication to base station 105-a indicating that the UE 115-a has reselected to a different base station. The sending network entity may be, for example, the UE 115-a, an MME, or the base station that the UE 115-a has reselected to (e.g., base station 105-b). For example, the indication may be included in context fetch message 820. The base station 105-a may release the UE context 360 maintained at the base station 105-a based on the indication.

In some cases, the base station 105-b may quickly (e.g., without waiting for expiration of an inactivity timer, etc.) transition the UE 115-a back to the semi-connected state (not shown) after receiving the UE context 360. Thus, an indication that a cell reselection is a semi-connected state cell reselection may reduce power consumption for UE-initiated cell reselection. In some embodiments, UE context may be shared between multiple base stations 105, which may reduce or eliminate cell reselection procedures for UEs in semi-connected state. In some examples, context areas are used for sharing of context information for UEs 115.

Figure 9:
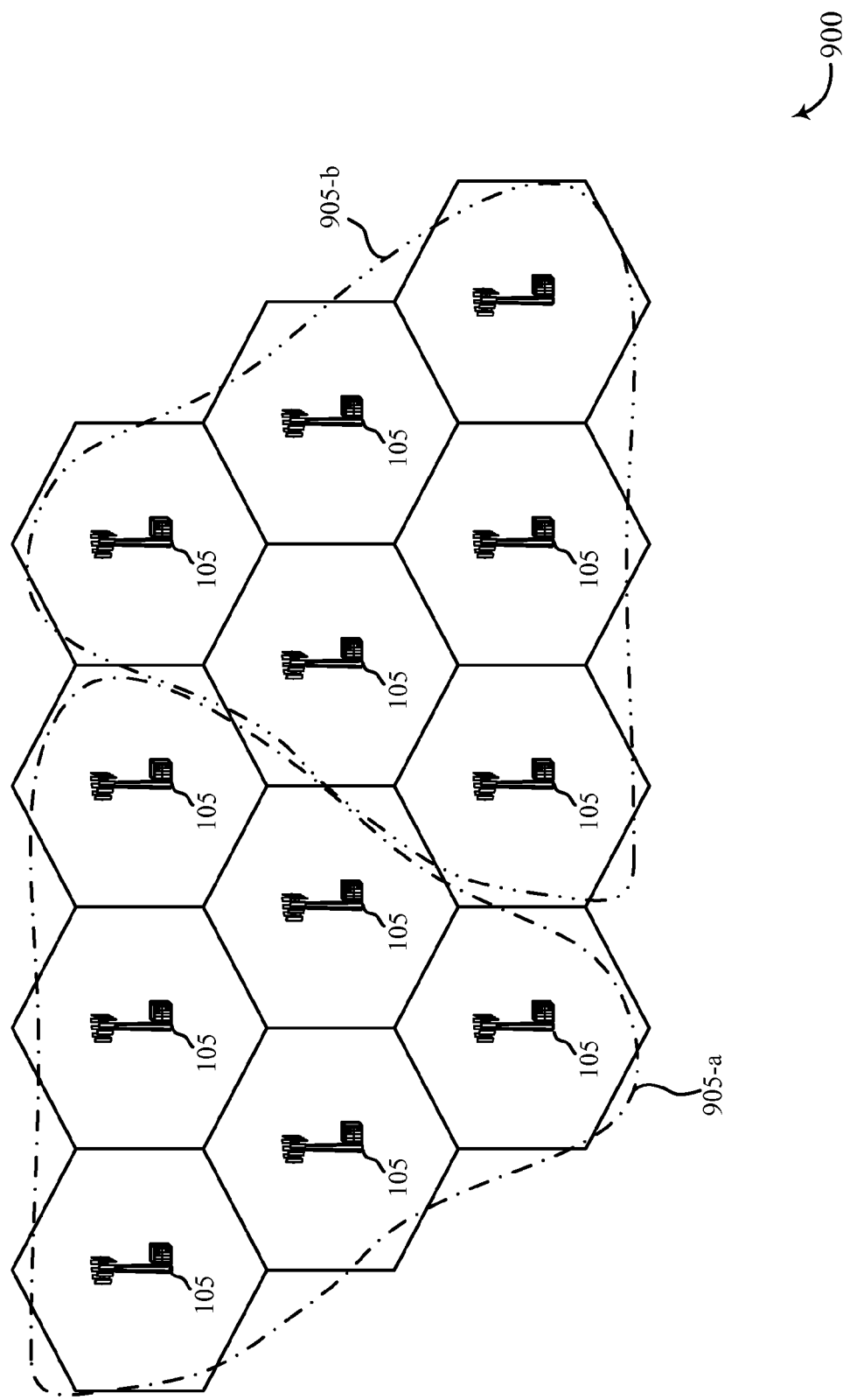
FIG. 9 shows a diagram of example context areas for semi-connected state operation in accordance with aspects of the present disclosure.

FIG. 9 shows a diagram 900 of example context areas for semi-connected state operation in accordance with aspects of the present disclosure. Diagram 900 may illustrate, for example, context areas in the wireless communications systems 100 or 200 described with reference to FIG. 1 or 2.

Diagram 900 shows context areas 905-a and 905-b. For each UE 115 served by a cell of a base station 105 within a context area 905, the base station 105 may share context for that UE 115 with other base stations 105 of the context area 905. The base stations 105 may share the context when a UE 115 is in the connected state, or the base stations 105 may share the context when the UE transitions to the semi-connected state. If the UE 115 moves out of the context area (e.g., reselects to a cell within a new context area 905), the new cell may perform a context fetch and the context for the UE may be released by the base stations 105 of the old context area 905.

UEs 115 in the semi-connected state that move within a context area 905 may reselect (e.g., camp on a new cell within the context area 905) without performing a random access procedure to connect to the new cell. Thus, cell-reselection and context fetch procedures may not be needed for mobility within the context area 905. However, when there is MO or MT data to be exchanged for the UE 115, the UE 115 may perform a random access procedure for the currently selected cell and the logical connections may be re-established (e.g., using the same or different S1 AP ID or TEID) at the cell where the data transmission occurs.

The context areas 905 may include groups of neighboring base stations 105, and may include the same or similar groups of base stations 105 as tracking areas used for idle-state UE paging. Additionally or alternatively, the context areas 905 may be different groups of base stations 105. For example, tracking areas generally include a relatively large number of base stations 105 to reduce the need for tracking area updates while UEs 115 are in the idle state, which the UEs 115 may be in for long periods of time between MO or MT communications. Because UEs 115 may be in the semi-connected state for less time than in the idle state, context areas 905 may include a smaller group of base stations 105 than tracking areas, in some cases. In some examples, the context areas 905 may include overlapping sets of base stations 105. Thus, some base stations 105 may be included in more than one context area 905. In various examples, UEs 115 may be assigned to a single context area 905, or to multiple context areas 905.

Using semi-connected state operation, various information for UEs 115 may be kept for a longer period of time. For instance, context maintained or transferred for UEs 115 in a semi-connected state may include UE state information, UE security information, UE capability information, radio resource control (RRC) configuration for the UE, an identity associated with a logical traffic connection for the UE, or combinations thereof. For example, the eNB key (KeNB) may be kept throughout several cycles of semi-connected state operation, and may be transferred between base stations 105 for semi-connected state mobility procedures. However, security for these procedures is generally similar to UEs 115 that may remain in the connected state for relatively long durations in various circumstances, and security is transferred between base stations 105 in connected state intra-E-UTRAN mobility.

In some embodiments, UEs 115 may perform security verification upon an initial data transfer when transitioning from the semi-connected state to the connected state. In some cases, the UE 115 may send an NAS message to the MME with the first data communication from the UE 115 after being in the semi-connected state. If the UE 115 does not receive an appropriate NAS reply from the MME, the UE can stop transmission and re-establish a connection (e.g., at a different cell). Because the NAS message uses a separate security key (NAS key), the UE 115 can then authenticate that it has not connected to a rogue eNB that has intercepted the KeNB. While the first packets transferred may be compromised, the UE 115 can quickly re-establish secure communications with the network.

Figure 10:
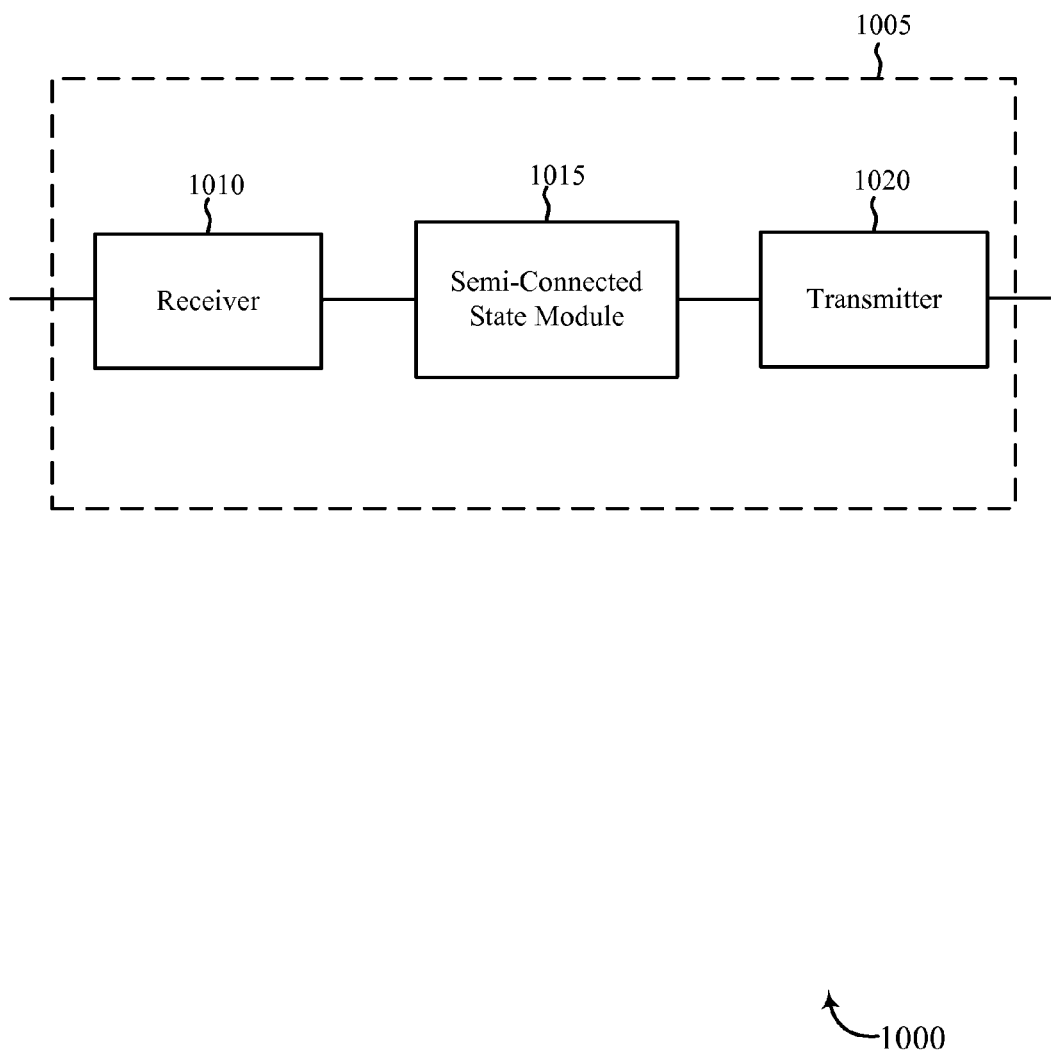
FIG. 10 shows a block diagram of a device for use in semi-connected state operation, in accordance with aspects of the present disclosure.

FIG. 10 shows a block diagram 1000 of an apparatus 1005 for use in semi-connected state operation, in accordance with aspects of the present disclosure. The apparatus 1005 may be an example of one or more aspects of a UE 115 described with reference to FIGS. 1-9. The apparatus 1005 may include a receiver 1010, a semi-connected state module 1015, and/or a transmitter 1020. The apparatus 1005 may also be, include, or be part of a processor (not shown). Each of these modules may be in communication with each other.

The receiver 1010 may include at least one radio frequency (RF) receiver operable to receive information such as packets, user data, and/or control information associated with various information channels (e.g., control channels, data channels, etc.). The receiver 1010 may be configured to receive messaging for UE state operation (e.g., RRC messaging, paging, control and data transmissions, etc.). Information may be passed on to the semi-connected state module 1015, and to other components of the apparatus 1005.

The semi-connected state module 1015 may manage semi-connected state operation procedures such as receiving an indication of moving from the connected state to the semi-connected state while continuing to be served by a base station, re-establishing a connection from the semi-connected state (e.g., random access preamble, RRC setup procedures, etc.), performing mobility procedures (e.g., cell reselection, etc.), monitoring system information, monitoring a paging channel, and the like. Additionally or alternatively, the semi-connected state module 1015 may manage a suppression of various communication functions while operating in the semi-connected state, such as a suppression of monitoring of a physical downlink control channel according to at least one temporary network identifier by the UE, suppression of monitoring of a user-specific search space in the physical downlink control channel, suppression of reporting of channel state information by the UE, or suppression of availability of uplink control information resources for the UE.

The transmitter 1020 may include at least one RF transmitter operable to transmit the one or more signals received from other components of the apparatus 1005. The transmitter 1020 may transmit messaging for UE state operation (e.g., RRC messaging, paging, control and data transmissions, etc.). In some examples, the transmitter 1020 may be collocated with the receiver 1010 in a transceiver.

Figure 11:
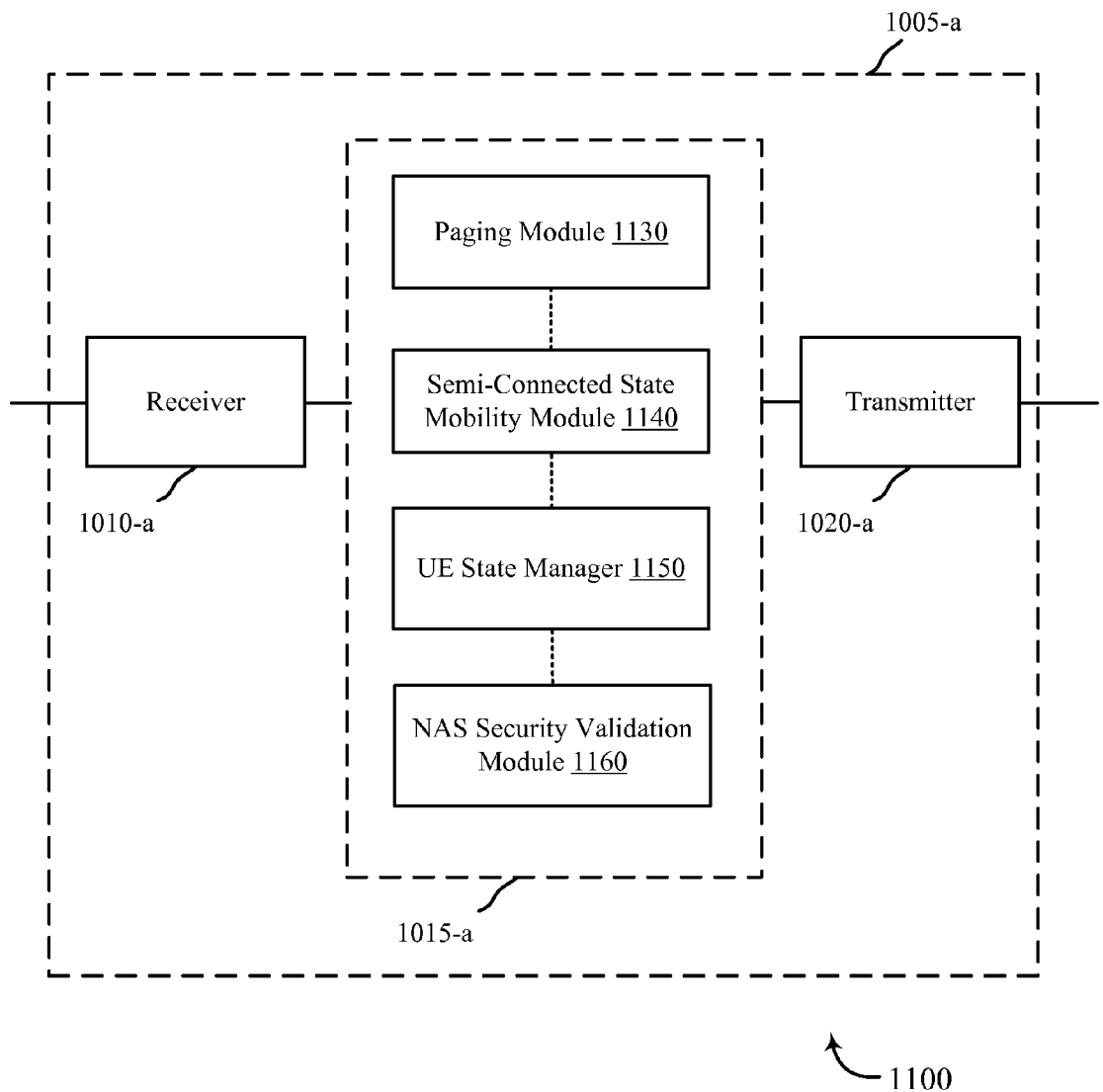
FIG. 11 shows a block diagram of a device for use in semi-connected state operation, in accordance with aspects of the present disclosure.

FIG. 11 shows a block diagram 1100 of an apparatus 1005-a for use in semi-connected state operation, in accordance with aspects of the present disclosure. The apparatus 1005-a may be an example of one or more aspects of a UE 115 described with reference to FIGS. 1-9, or apparatus 1005 described with reference to FIG. 10. The apparatus 1005-a may include a receiver 1010-a, a semi-connected state module 1015-a, and/or a transmitter 1020-a, which may be examples of the corresponding modules of apparatus 1005. The apparatus 1005-a may also be, include, or be part of a processor (not shown). Each of these components may be in communication with each other. The semi-connected state module 1015-a may include paging module 1130, semi-connected state mobility module 1140, UE state manager 1150 and/or NAS security validation module 1160. The receiver 1010-*a* and the transmitter 1020-*a* may perform the functions of the receiver 1010 and the transmitter 1020, described with reference to FIG. 10, respectively.

UE state manager 1150 may manage state transitions for a UE 115 implementing the apparatus 1005-*a*. For example, UE state manager 1150 may determine (e.g., based on signaling from a base station, etc.) to enter the semi-connected state while continuing to be served by a base station. UE state manager 1150 may maintain RRC context information (e.g., device identification, security information, etc.) in the semi-connected state.

Semi-connected state mobility module 1140 may manage mobility for the UE 115 in the semi-connected state. For example, semi-connected state mobility module 1140 may initiate cell reselection based on cell measurements indicating a stronger cell (e.g., transitioning to being served by a different base station, etc.). Semi-connected state mobility module 1140 may perform cell reselection in the semi-connected state by sending an access request to the different base station to trigger a change in being served by the different base station, which may then fetch the UE context for re-establishing the connection according to the context. Additionally or alternatively, upon determining that it should re-select to the different base station, semi-connected state mobility module 1140 may initiate a return to the connected state with the original base station to initiate a handover to the different base station.

Paging module 1130 may receive validation paging while the UE 115 is in the semi-connected state. For example, paging module 1130 may monitor for validation paging messages in the semi-connected state according to a DRX cycle that may be the same as or different from a DRX cycle for the idle state, as discussed above. Paging module 1130 may also monitor for and respond to validation paging (e.g., using a predetermined validation paging RNTI (V-RNTI), etc.) from the base station. When a validation paging message is received, paging module 1130 may send a validation response message (e.g., random access preamble, uplink control information message, etc.).

In some examples the UE state manager 1150 may trigger, based on the presence of MO or MT data, a transition back to the connected state from the semi-connected state. UE state manager 1150 may perform an RRC setup procedure to re-enter the connected state, which may be performed with fewer messaging steps than RRC setup from the idle state because the UE context information is maintained at the base station 105 that the UE is being served by. For example, security information may not have to be re-established for the RRC connection for the UE 115.

NAS security validation module 1160 may, upon re-establishing a connection with the second base station, perform an NAS security validation procedure with an initial transfer of data. For example, NAS security validation module 1160 may send an NAS message to the MME with the first user-plane data transfer via a new base station after a semi-connected state mobility procedure. If the MME does not reply with an appropriate NAS response, the NAS security validation module 1160 may determine that security has been compromised, and may terminate communication with the new base station.

The functions of the components of apparatuses 1005 described with reference to FIG. 10 or FIG. 11 may be implemented, in whole or in part, with instructions embodied in a memory, formatted to be executed by one or more general or application-specific processors (e.g., CPUs, cores, etc.). For example, the described components may represent instructions embodied in one or more functions, subroutines, classes, modules, and/or packages that may be compiled to execute on the one or more processors or may be interpreted at run-time by the one or more processors. Additionally or alternatively, various components of the apparatuses 1005 may, individually or collectively, be implemented in hardware using one or more application-specific integrated circuits (ASICs), Field Programmable Gate Arrays (FPGAs), and/or other Semi-Custom components or integrated circuits (ICs), which may be programmed (e.g., configured, synthesized from a hardware description language (HDL), etc.) in any manner known in the art.

Figure 12:
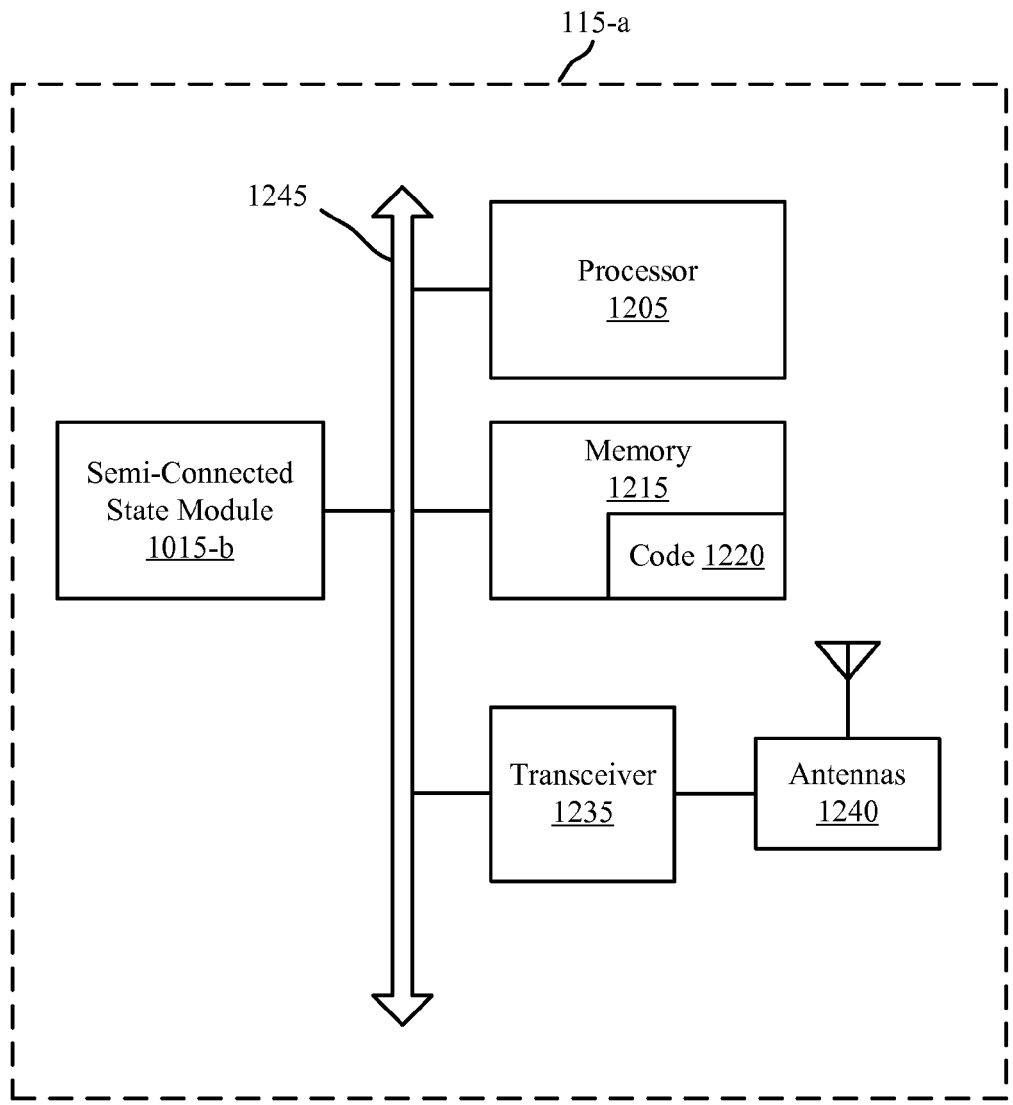
FIG. 12 shows a block diagram of a UE configured for semi-connected state operation, in accordance with aspects of the present disclosure.

FIG. 12 shows a block diagram 1200 of a UE 115-*b* configured for semi-connected state operation, in accordance with aspects of the present disclosure. UE 115-*b* may be an example of the UEs 115 described with reference to FIGS. 1-9. UE 115-*b* may also be an example of one or more aspects of apparatus 1005 described with reference to FIGS. 10 and 11.

The UE 115-*b* may generally include components for bi-directional voice and data communications including components for transmitting communications and components for receiving communications. The UE 115-*b* may include antenna(s) 1240, transceiver(s) 1235, processor module(s) 1205, and memory 1215 (including software/firmware code 1220), which each may communicate, directly or indirectly, with each other (e.g., via one or more buses 1245). The transceiver(s) 1235 may be configured to communicate bi-directionally, via the antenna(s) 1240 and/or one or more wired or wireless links, with one or more networks, as described above. For example, the transceiver(s) 1235 may be configured to communicate bi-directionally with base stations 105 and/or other UEs 115. The transceiver(s) 1235 may include a modem configured to modulate the packets and provide the modulated packets to the antenna(s) 1240 for transmission, and to demodulate packets received from the antenna(s) 1240. While the UE 115-*b* may include a single antenna 1240, the UE 115-*b* may have multiple antennas 1240 capable of concurrently transmitting and/or receiving multiple wireless transmissions. The transceiver(s) 1235 may be capable of concurrently communicating with one or more base stations 105 via multiple component carriers.

The UE 115-*b* may include semi-connected state module 1015-*b*, which may be configured to perform and/or control some or all of the features and/or functions described above with reference to FIGS. 1-9 related to semi-connected state operation. In some examples, the semi-connected state module 1015-*b* may be part of the software/firmware code 1220 and may include instructions that are configured to cause the processor module 1205 to perform various functions described herein (e.g., performing RRC connection operations for semi-connected state operation, monitoring for paging according to a semi-connected state DRX cycle, etc.). The semi-connected state module 1015-*b* may be an example of semi-connected state modules 1015 described with reference to FIG. 10 or 11.

The memory 1215 may include random access memory (RAM) and read-only memory (ROM). The memory 1215 may store computer-readable, computer-executable software/firmware code 1220 containing instructions that are configured to, when executed, cause the processor module 1205 to perform various functions described herein. Alternatively, the computer-readable, computer-executable software/firmware code 1220 may not be directly executable by the processor module 1205 but be configured to cause a computer (e.g., when compiled and executed) to perform functions described herein. The processor module 1205 may include an intelligent hardware device, e.g., a central processing unit (CPU), a microcontroller, an application-specific integrated circuit (ASIC), etc.

Figure 13:
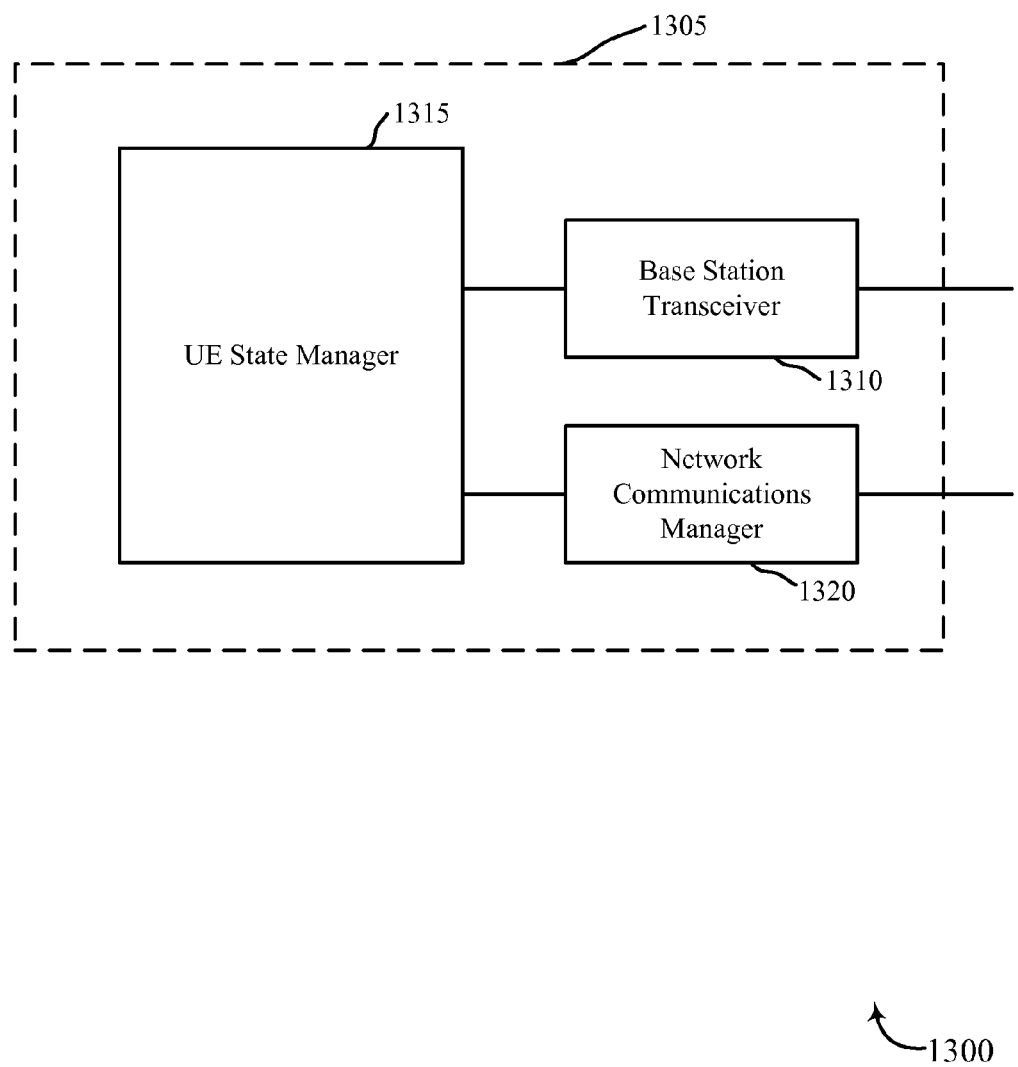
FIG. 13 shows a block diagram of a device for semi-connected state operation, in accordance with aspects of the present disclosure.

FIG. 13 shows a block diagram 1300 of an apparatus 1305 for semi-connected state operation, in accordance with aspects of the present disclosure. In some examples, the apparatus 1305 may be an example of aspects of one or more of the base stations 105 described with reference to FIGS. 1-9. In some examples, the apparatus 1305 may be part of, or include an LTE/LTE-A eNB and/or an LTE/LTE-A base station. The apparatus 1305 may also be a processor. The apparatus 1305 may include a base station transceiver 1310, a UE state manager 1315, and/or network communications manager 1320. Each of these modules may be in communication with each other.

In some examples, the base station transceiver 1310 may include at least one RF transmitter and at least one RF receiver operable to receive transmit and receive communications with UEs for UE state management (e.g., RRC messaging, paging, control and data transmissions, etc.). The base station transceiver 1310 may be used to communicate various types of data and/or control signals (i.e., transmissions) over one or more communication links of a wireless communication system, such as the wireless communications systems 100 or 200 described with reference to FIG. 1 or 2.

The network communications manager 1320 may be configured to communicate with various entities of a communications network (e.g., MME, S-GW, P-GW, other base stations 105, etc.) using various network protocols (e.g., S1 protocol, X2 protocol, etc.). The network communications manager 1320 may include wired and/or wireless communication components for formatting, encoding, decoding, modulating, demodulating, transmitting, and receiving networking messaging using the various networking protocols.

The UE state manager 1315 may manage state operation for UEs camped on, served by, and/or otherwise connected to a base station 105. For example, UE state manager 1315 may determine (e.g., based on a connected state inactivity timer, a data traffic condition, and indication from a S-GW, etc.) that a UE 115 in connected state should be moved out of the connected state while continuing to be served by the base station 105. The UE state manager 1315 may maintain UE context 360 and/or the logical traffic connections (e.g., S1-C, S1-U, etc.) for UEs 115 in the semi-connected state.

The UE state manager 1315 may communicate (e.g., via base station transceiver 1310) messaging to UEs 115 for managing UE state operation. For example, UE state manager 1315 may receive control channel, random access channel, and RRC messaging from UEs, and may determine appropriate UE state actions. The UE state manager 1315 may communicate messaging (e.g., RRC messaging, etc.) for state operation to UEs 115, and may indicate, in transitioning a UE 115 out of the connected state, the state that the UE 115 should transition to (e.g., semi-connected or idle).

Figure 14:
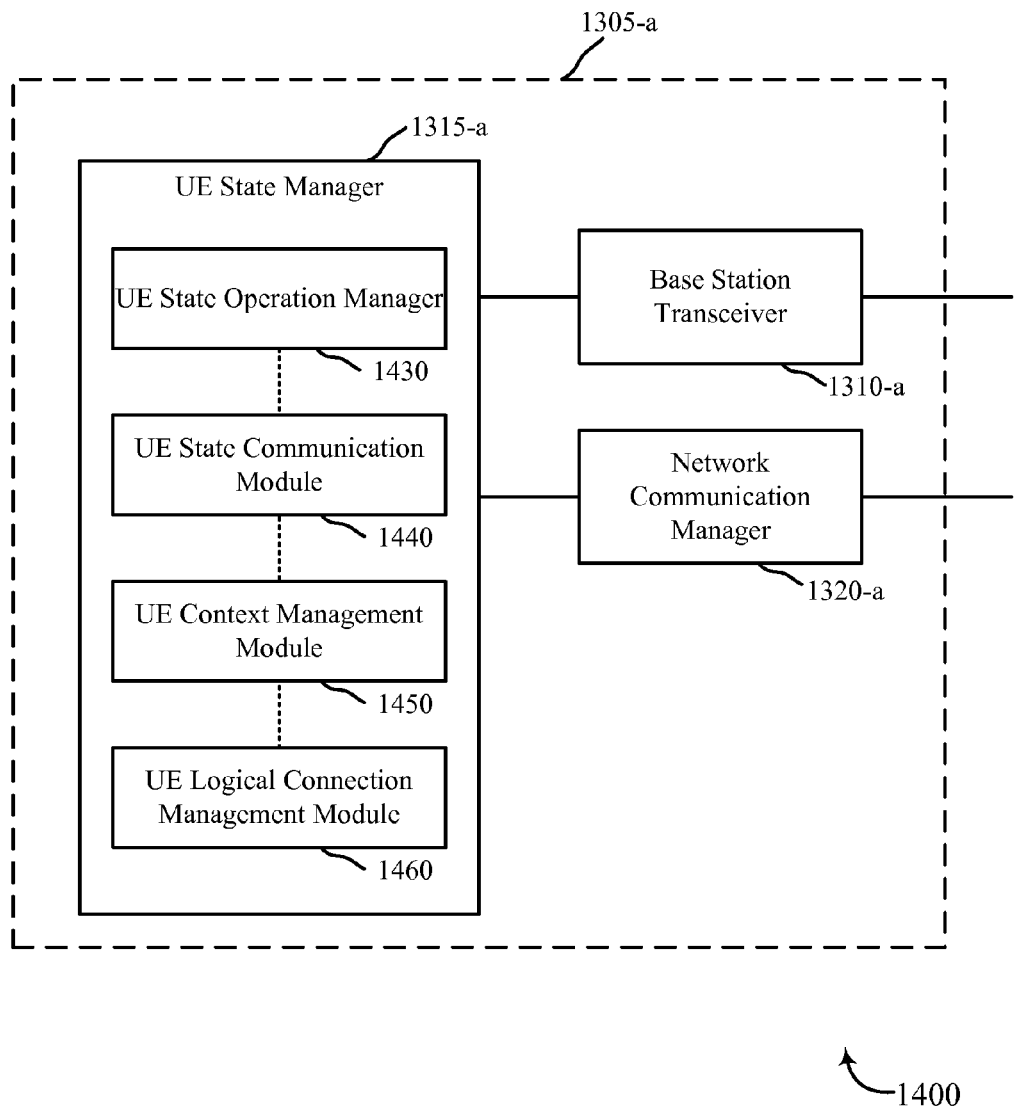
FIG. 14 shows a block diagram of an device for semi-connected state operation, in accordance with aspects of the present disclosure.

FIG. 14 shows a block diagram 1400 of an apparatus 1305-*a* for semi-connected state operation, in accordance with aspects of the present disclosure. In some examples, the apparatus 1305-*a* may be an example of aspects of one or more of the base stations 105 described with reference to FIGS. 1-9, or apparatus 1305 described with reference to FIG. 13. In some examples, the apparatus 1305-*a* may be part of, or include an LTE/LTE-A eNB and/or an LTE/LTE-A base station. The apparatus 1305-*a* may also be, include, or be part of a processor. The apparatus 1305-*a* may include a base station transceiver 1310-*a*, a UE state manager 1315-*a*, and/or network communications manager 1320-*a*. Each of these modules may be in communication with each other.

In some examples, base station transceiver 1310-*a* may be an example of one or more aspects of the base station transceiver 1310 described with reference to FIG. 13. In some examples, the network communications manager 1320-*a* may be an example of one or more aspects of the network communications manager 1320 described with reference to FIG. 13.

UE state manager 1315-*a* may include UE state operation manager 1430, UE state communication module 1440, UE context management module 1450, and/or UE logical connection management module 1460. UE state operation manager 1430 may determine, for a connected state UE 115, that the UE 115 is to be moved out of the connected state. UE state communication module 1440 may communicate messaging for UE state operation with the UE 115. For example, the UE state communication module 1440 may indicate to the UE that it should transition out of the connected state.

UE context management module 1450 may manage UE context for the UE after it leaves the connected state. For example, UE context management module 1450 may maintain the UE context for UEs that are served by the apparatus 1305-*a* in the semi-connected state, which may include UE state information, UE security information, UE capability information, a RRC configuration for the UE, or an identity associated with at least one logical traffic connection for the UE. UE logical connection management module 1460 may manage logical connections for the UE 115, such as a logical connection for control plane traffic or user plane traffic. For example, UE logical connection management module 1460 may maintain logical connections (e.g., S1-C, S1-U, etc.) for UEs 115 in the semi-connected state.

UE state operation manager 1430 may classify some connected state UEs for semi-connected state operation and not others. Determining whether to classify a UE for semi-connected state operation may be based on UE identity, UE capability, UE configuration, UE priority information, UE data traffic history, UE connection history, a packet data network (PDN) identifier associated with a data connection of the UE 115, a loading condition of the base station, and the like. For example, the UE state operation manager 1430 can evaluate various loading conditions such as usage of physical or logical resources of the base station 105 (e.g., memory, concurrent processes, address space, etc.), and may determine a priority order for using semi-connected state for connected state UEs with the capability of operating in semi-connected state.

Based on classification of connected state UEs 115 being served by a base station 105, the UE state operation manager 1430 may determine connected state inactivity timers for the UEs 115, which may depend on UE classification. UEs 115 classified to use semi-connected state operation may be transitioned from the connected state to the semi-connected state at the expiration of the associated connected state inactivity timer, while UEs not classified to use semi-connected state operation may be transitioned directly to the idle state from the connected state.

The UE state operation manager 1430 may transition a UE 115 being served by a base station 105 from the semi-connected state to the idle state for a variety of reasons. For example, the UE state operation manager 1430 may start a timer upon the UE 115 entering the semi-connected state, and if the timer expires with the UE 115 still in the semi-connected state, the UE 115 may be transitioned to the idle state. Additionally or alternatively, the UE state operation manager 1430 may transition the UE 115 to the idle state if a loading condition occurs at the base station 105, such as an overload condition. For example, if a large number of UEs 115 are in the connected or semi-connected states, it is possible for the base station 105 to run out of address space for the C-RNTIs assigned to the UEs 115. Other loading conditions may occur based on memory or other constraints for maintaining a large number of UE contexts or logical traffic connections (e.g., S1-C and S1-U connections). If a loading condition occurs, the UE state operation manager 1430 may transition some semi-connected UEs to the idle state, in order of priority (e.g., UE priority, PDN connection priority, etc.), time elapsed in the semi-connected state, or combinations of priority and time elapsed. In some examples, the base station 105 may transition one or more UEs 115 to the idle state based on one or both of a data traffic type or an APN. To transition the UE 115 to the idle state, the UE state communication module 1440 may send a message via base station transceiver 1310-a (e.g., RRC Connection Release).

The base station transceiver 1310-a may perform paging for UEs 115 being served by a base station 105 in the semi-connected state. The DRX cycle for semi-connected state may be the same or different from a DRX cycle for the idle state, as discussed above. The base station transceiver 1310-a may receive messaging from UEs in the semi-connected state for re-entering the connected state (e.g., random access preamble, RRC connection setup, etc.). The UE state operation manager 1430 may associate the UE 115 with the stored context and/or logical connections maintained by the UE context management module 1450 and UE logical connection management module 1460.

In some examples, the base station transceiver 1310-a may perform validation paging for UEs 115 being served by a base station 105 in the semi-connected state, which may include transmitting a validation paging message. If a UE 115 in the semi-connected state does not respond to a validation paging message with a validation response, the UE context management module 1450 and UE logical connection management module 1460 may release the UE context and/or logical traffic connections for the UE.

The network communications manager 1320-a may share the UE context with other base stations. For example, the network communications manager 1320-a may share the UE context with base stations of a context area of the apparatus 1305-a, a tracking area of the apparatus 1305-a, a neighbor list of the apparatus 1305-a, or a neighbor list of a UE 115. For example, the network communications manager 1320-a may share the UE context with base stations in a neighbor list maintained for the UE 115.

The functions of the components of apparatuses 1305 described with reference to FIG. 13 or FIG. 14 may be implemented, in whole or in part, with instructions embodied in a memory, formatted to be executed by one or more general or application-specific processors (e.g., CPUs, cores, etc.). For example, the described components may represent instructions embodied in one or more functions, subroutines, classes, modules, and/or packages that may be compiled to execute on the one or more processors or may be interpreted at run-time by the one or more processors. Additionally or alternatively, various components of the apparatuses 1305 may, individually or collectively, be implemented in hardware using one or more ASICs, FPGAs, and/or other Semi-Custom components or ICs, which may be programmed (e.g., configured, synthesized from a hardware description language (HDL), etc.) in any manner known in the art.

Figure 15:
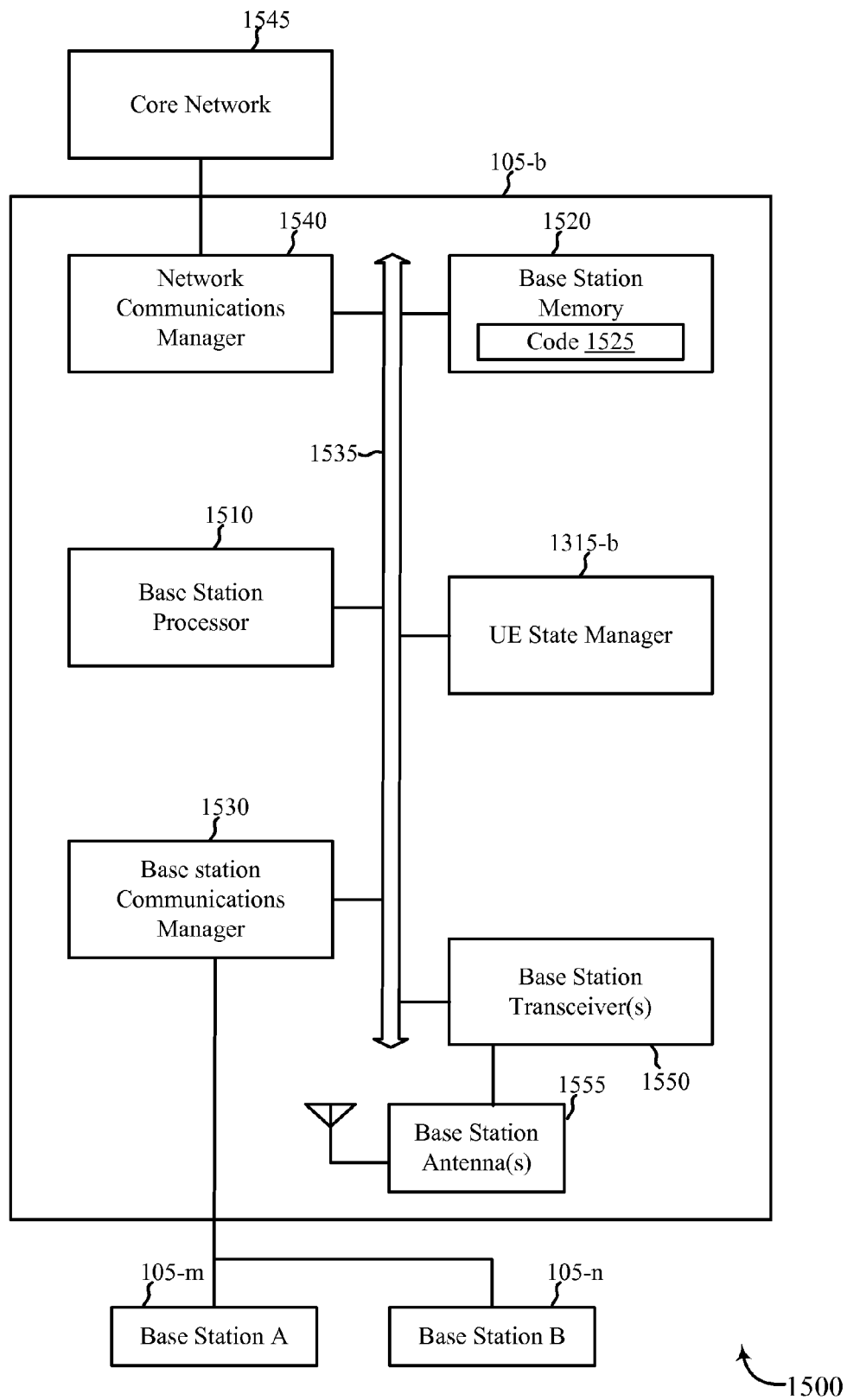
FIG. 15 shows a block diagram of a base station (e.g., a base station forming part or all of an eNB) for semi-connected state operation, in accordance with aspects of the present disclosure.

FIG. 15 shows a block diagram 1500 of a base station 105-b (e.g., a base station forming part or all of a base station) for semi-connected state operation, in accordance with aspects of the present disclosure. In some examples, the base station 105-b may be an example of aspects of one or more of the base stations 105 described with reference to FIGS. 1-9, and/or aspects of one or more of the apparatuses 1305 when configured as a base station, as described with reference to FIGS. 13 and/or 14. The base station 105-b may be configured to implement or facilitate at least some of the base station and/or apparatus features and functions described with reference to FIG. 1-9, 13 or 14.

The base station 105-b may include a base station processor module 1510, a base station memory module 1520 (including software/firmware code 1525), one or more base station transceiver module(s) 1550, one or more base station antenna(s) 1555, and/or a UE state manager 1315-b. The base station 105-b may also include one or more of a base station communications module 1530 and/or a network communications module 1540. Each of these modules may be in communication with each other, directly or indirectly, over one or more buses 1535.

The UE state manager 1315-b may be configured to perform and/or control some or all of the features and/or functions described above with reference to FIGS. 1-9 related to semi-connected state management for UEs 115. In some examples, the UE state manager 1315-b may be part of the software/firmware code 1525 and may include instructions that are configured to cause the base station processor module 1510 to perform various functions described herein (e.g., determining if UEs should utilize semi-connected state operation, exchange signaling with UEs related to UE state operation, manage UE context and logical connections, etc.). The UE state manager 1315-b may be an example of UE state managers 1315 described with reference to FIGS. 13 and 14.

The base station memory module 1520 may include random access memory (RAM) and/or read-only memory (ROM). The base station memory module 1520 may store computer-readable, computer-executable software/firmware code 1525 containing instructions that are configured to, when executed, cause the base station processor module 1510 to perform various functions described herein. Alternatively, the computer-readable, computer-executable software/firmware code 1525 may not be directly executable by the base station processor module 1510 but be configured to cause the base station processor module 1510 (e.g., when compiled and executed) to perform various of the functions described herein.

The base station processor module 1510 may include an intelligent hardware device, e.g., a central processing unit (CPU), a microcontroller, an ASIC, etc. The base station processor module 1510 may process information received through the base station transceiver(s) 1550, the base station communications module 1530, and/or the network communications module 1540. The base station processor module 1510 may also process information to be sent to the transceiver(s) 1550 for transmission through the antenna(s) 1555, to the base station communications module 1530, for transmission to one or more other base stations 105-m and 105-n, and/or to the network communications module 1540 for transmission to a core network 1545, which may be an example of one or more aspects of the core network 130 described with reference to FIG. 1.

The base station transceiver(s) 1550 may include a modem configured to modulate packets and provide the modulated packets to the base station antenna(s) 1555 for transmission, and to demodulate packets received from the base station antenna(s) 1555. The base station transceiver(s) 1550 may, in some examples, be implemented as one or more base station transmitters and one or more separate base station receivers. The base station transceiver(s) 1550 may be configured to communicate bi-directionally, via the antenna(s) 1555, with one or more UEs or apparatuses, such as one or more of the UEs 115 described with reference to FIGS. 1-12. The base station 105-*b* may, for example, include multiple base station antennas 1555 (e.g., an antenna array). The base station 105-*b* may communicate with the core network 1545 through the network communications module 1540. The base station 105-*b* may also communicate with other base stations, such as the base stations 105-*m* and 105-*n*, using the base station communications module 1530.

Figure 16:
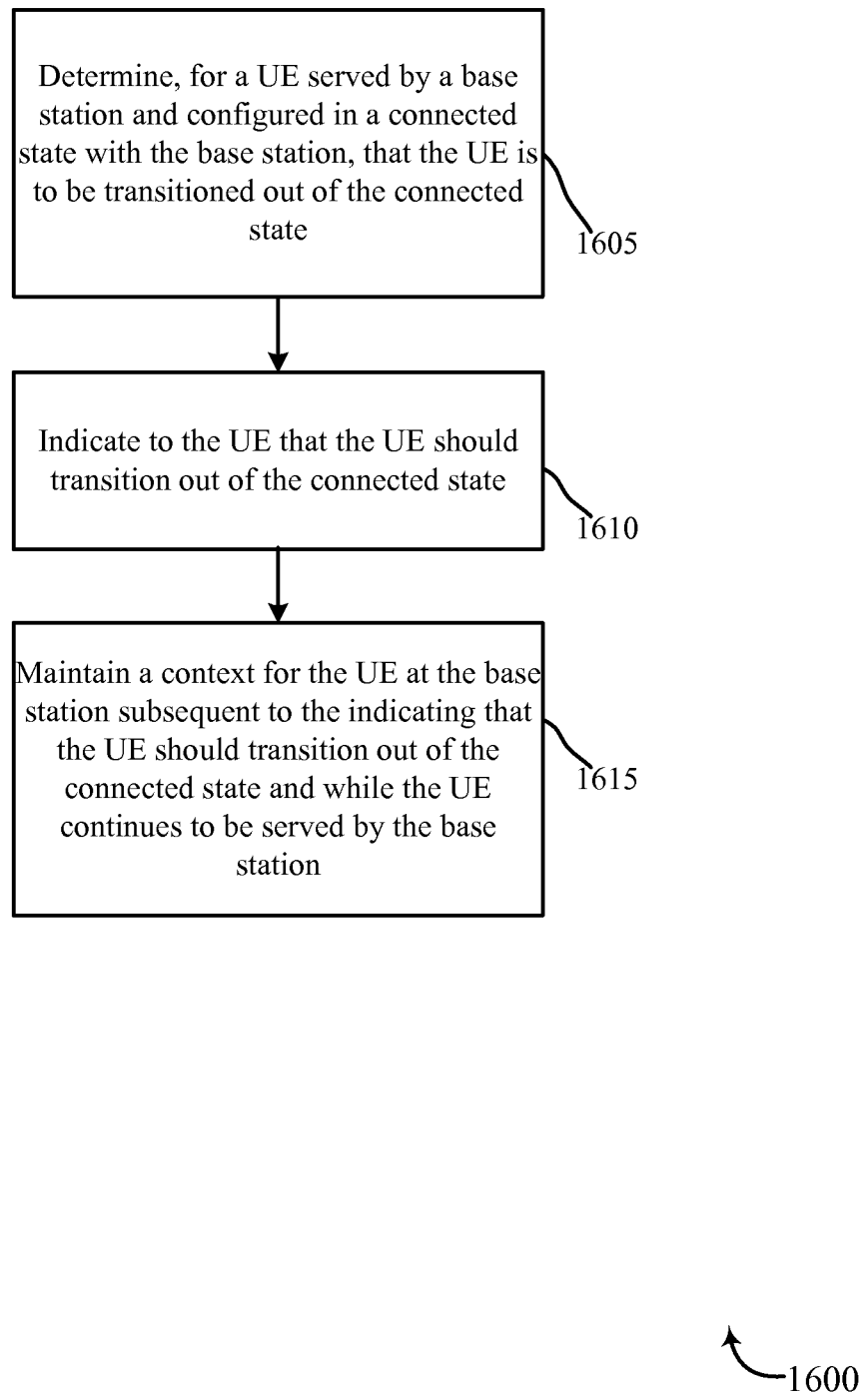
FIG. 16 is a flow chart illustrating an example of a method for wireless communication, in accordance with aspects of the present disclosure.

FIG. 16 is a flow chart illustrating an example of a method 1600 for wireless communication, in accordance with aspects of the present disclosure. For clarity, the method 1600 is described below with reference to aspects of one or more of the base stations 105 described with reference to FIG. 1-9, or 15, and/or aspects of one or more of the apparatuses 1305 described with reference to FIG. 13 or 14. In some examples, a base station 105 may execute one or more sets of codes to control the functional elements of the base station 105 to perform the functions described below. Additionally or alternatively, the base station 105 may perform one or more of the functions described below using special-purpose hardware.

At block 1605, the base station 105 may determine, for a UE 115 served by the base station and configured in a connected state with the base station, that the UE 115 is to be transitioned out of the connected state. For example, the base station 105 may have classified the UE 115 to use semi-connected state operation based on UE identity, UE capability, UE configuration, UE priority information, UE data traffic history, UE connection history, a PDN identifier associated with a data connection of the UE 115, a loading condition of the base station, and the like. In some cases, determining that the UE 115 is to be moved out of the connected state may be as a result of expiration of a connected state inactivity timer, which may be configured to be shorter than a connected state inactivity timer for UEs not classified to use the semi-connected state. In some examples, determining that the UE 115 is to be moved out of the connected state may be based on any one or more of a data traffic condition, an indication from a serving gateway, a data traffic type, or an APN. The operation(s) at block 1605 may be performed using the UE state operation manager 1430 described with reference to FIG. 14.

At block 1610, the base station 105 may indicate to the UE 115 that the UE 115 should transition out of the connected state. For example, the base station 105 may send a message to the UE 115 (e.g., RRC Connection Release), and may indicate in the message that the UE 115 is to transition to the semi-connected state. The operation(s) at block 1605 may be performed using the UE state operation manager 1430 or base station transceivers 1310 described with reference to FIG. 13 or 14.

At block 1615, the base station 105 may maintain a context for the UE 115 at the base station subsequent to the indicating that the UE 115 should transition out of the connected state and while the UE 115 continues to be served by the base station 105. The operation(s) at block 1605 may be performed using the UE context management module 1450 or the UE context management module 1450 described with reference to FIG. 14.

Figure 17:
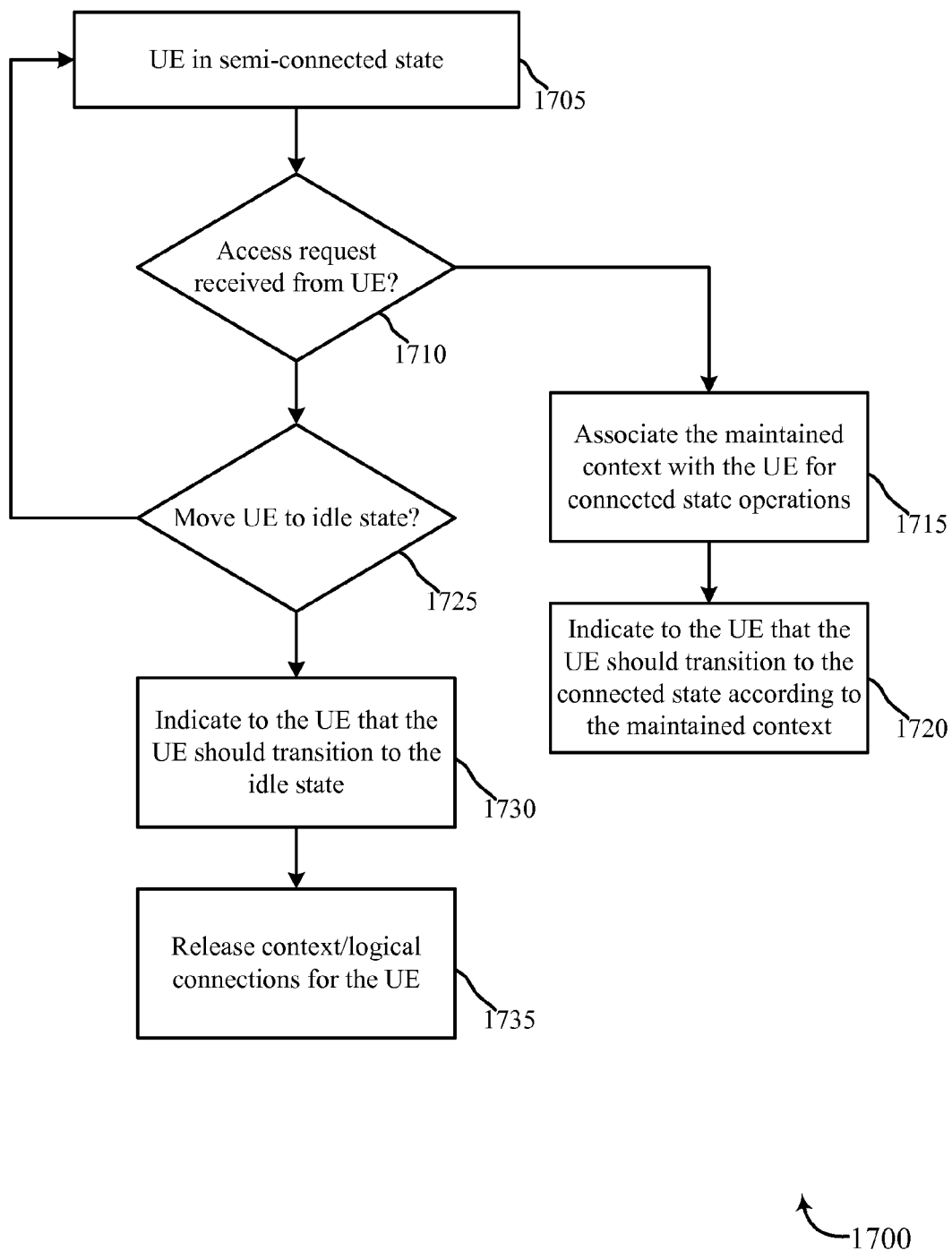
FIG. 17 is a flow chart illustrating an example of a method for wireless communication, in accordance with aspects of the present disclosure.

FIG. 17 is a flow chart illustrating an example of a method 1700 for wireless communication, in accordance with aspects of the present disclosure. For clarity, the method 1700 is described below with reference to aspects of one or more of the base stations 105 described with reference to FIG. 1-9, or 15, and/or aspects of one or more of the devices described with reference to FIG. 13 or 14. In some examples, a base station 105 may execute one or more sets of codes to control the functional elements of the base station 105 to perform the functions described below. Additionally or alternatively, the base station 105 may perform one or more of the functions described below using special-purpose hardware.

At block 1705, the base station 105 may have moved a UE 115 to be in the semi-connected state while continuing to be served by the base station 105. In the semi-connected state, the base station 105 may maintain a context for the UE, and in some examples may maintain a logical traffic connection information for the UE 115. The base station may also perform validation paging by transmitting validation paging messages to the UE 115 periodically and releasing the context if a validation response is not received from the UE 115.

At block 1710, the base station 105 may determine if an access request has been received from the UE 115. If the UE 115 has sent an access request, the base station 105 may re-establish the RRC connection with the UE 115 and associate the UE context and/or logical traffic connections maintained for the UE 115 in the semi-connected state with the UE 115 for connected state operations at block 1715. The base station 105 may indicate to the UE 115 that it should transition to the connected state according to the maintained context at block 1720. Thus, the base station 105 may re-establish an RRC connection according to the saved UE context and/or logical traffic connections established during a previous connected state operation. The operation(s) at blocks 1710, 1715, and 1720 may be performed using the UE state operation manager 1430 or base station transceivers 1310 described with reference to FIG. 13 or 14.

If, at block 1710, the base station 105 determines that no access request has been received, the base station 105 may determine if it should move the UE 115 to the idle state at block 1725. For example, the base station 105 may start a timer upon the UE 115 entering the semi-connected state, and if the timer expires with the UE 115 still in the semi-connected state, the UE 115 may be transitioned to the idle state. In some examples, the base station 105 may transition a UE 115 to an idle state based on an overload condition. In some examples, the decision to move a UE to an idle state may be based on one or both of a data traffic type or an APN. The base station 105 may indicate to the UE that the UE should transition to the idle state at block 1730. The base station 105 may release the UE context and/or the logical traffic connection at block 1735. In various examples, the UE 115 may continue to be served by the base station 105 after transitioning to the idle state. The operation(s) at blocks 1725, 1730, and 1735 may be performed using the UE state operation manager 1430 or base station transceivers 1310 described with reference to FIG. 13 or 14.

Figure 18:
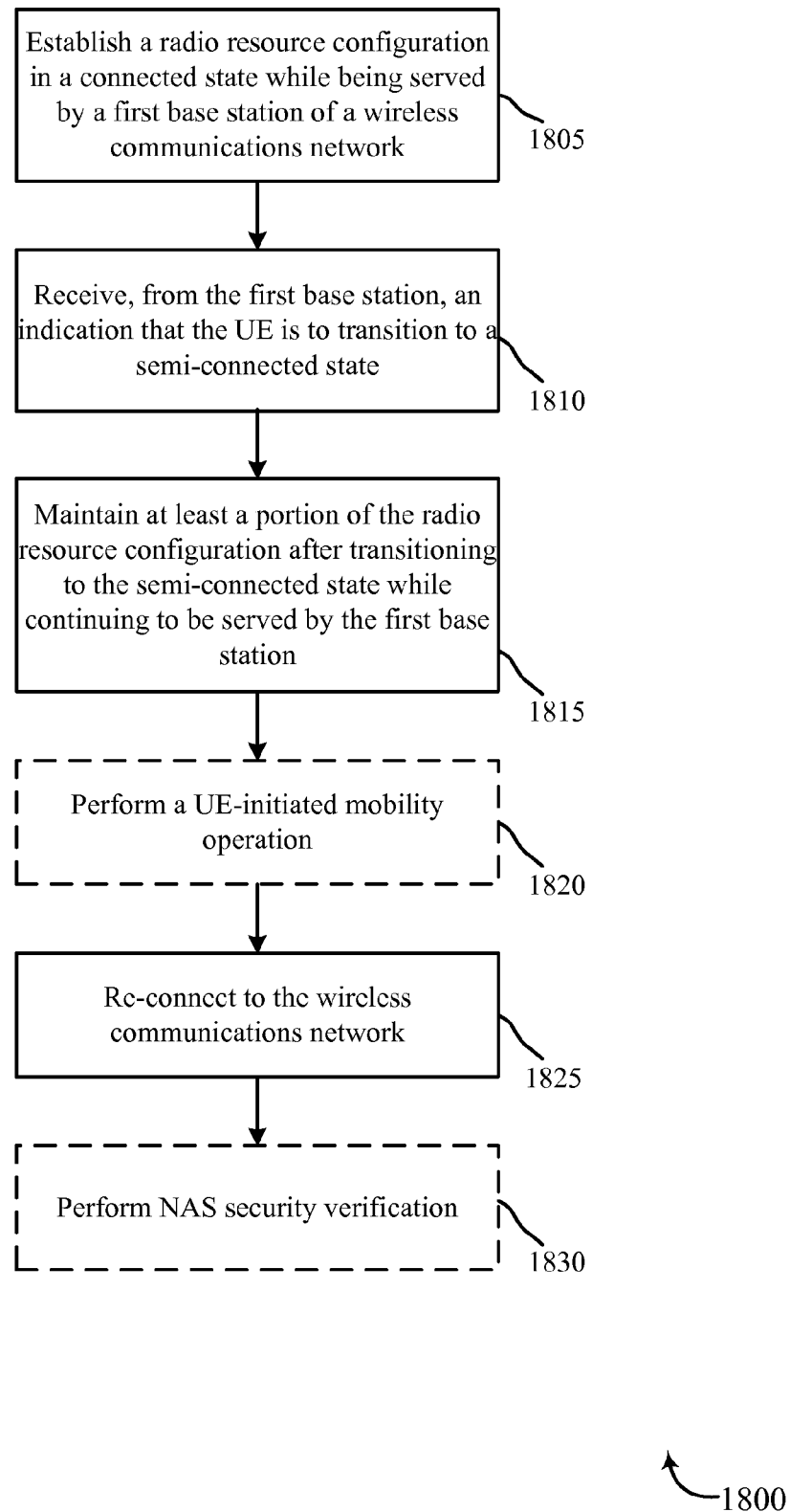
FIG. 18 is a flow chart illustrating an example of a method for wireless communication, in accordance with aspects of the present disclosure.

FIG. 18 is a flow chart illustrating an example of a method 1800 for wireless communication, in accordance with aspects of the present disclosure. For clarity, the method 1800 is described below with reference to aspects of one or more of the UEs 115 described with reference to FIG. 1-9, or 12, and/or aspects of one or more of the devices described with reference to FIG. 9 or 10. In some examples, a UE 115 may execute one or more sets of codes to control the functional elements of the UE 115 to perform the functions described below. Additionally or alternatively, the UE 115 may perform one or more of the functions described below using special-purpose hardware.

At block 1805, the UE may establish a radio resource configuration in a connected state to be served by a first base station (e.g., base station 105) of a wireless communications network (e.g., the wireless communications systems 100 or 200 described with reference to FIG. 1 or 2). For example, the UE may perform a network attach procedure and establish an RRC connection with the first base station, and may establish one or more packet data network (PDN) sessions with entities of the wireless communications network or other networks (e.g., the Internet, etc.). Thus, the UE may be in the connected state (e.g., RRC_CONNECTED, etc.) with the first base station, and served by the first base station.

At block 1810, the UE may receive, from the first base station, an indication that the UE is to transition to a semi-connected state. For example, the first base station may send the UE a connection release message (e.g., RRC connection release, etc.) that indicates that the UE should transition to the semi-connected state.

At block 1815, the UE may maintain at least a portion of the radio resource configuration after transitioning to the semi-connected state while continuing to be served by the first base station (e.g., configured such that communications between the UE and a core network are to be routed via the first base station). For example, the UE may maintain UE context information associated with the radio resource connection with the wireless communications network while the UE continues to be served by the first base station in the semi-connected state. For example, the UE may store connection information including RRC security information, NAS security information, temporary network identifiers for the UE (e.g., C-RNTI, etc.), and the like.

In the semi-connected state, the UE may monitor for system information and may monitor a paging channel for paging from the wireless communications network. The UE may disable (e.g., power-down, etc.) its receiver when not monitoring for system information or for paging. In some examples, the UE may monitor the paging channel according to a DRX cycle that may be different from a DRX cycle used in the idle state. For example, the DRX cycle for the semi-connected state may be a fraction of the DRX cycle for the idle state. Thus, if the UE is configured for a particular idle-state DRX cycle (e.g., 32, 64, 128 or 256 frames, etc.), the semi-connected state DRX cycle may be the idle-state DRX cycle divided by a DRX cycle divisor (e.g., 2, 4, 8, etc.). The semi-connected state DRX cycle or DRX cycle divisor may be received in broadcast information from the base station (e.g., system information, etc.). Additionally or alternatively, the UE may negotiate a different semi-connected state DRX cycle or DRX cycle divisor with the base station.

In the semi-connected state, the UE may also monitor for and respond to validation paging from the base station. For example, the UE may monitor for validation paging messages using a predetermined validation paging RNTI (V-RNTI). When a validation paging message is received, the UE may send a validation response message (e.g., random access preamble, uplink control information message, etc.). In one example, the UE may respond with a predetermined or assigned preamble for responding to validation paging on a random access channel (e.g., non-contention preamble, etc.).

Additionally or alternatively, the UE may suppress various communication functions while operating in a semi-connected state, such as suppressing of a monitoring of a physical downlink control channel according to at least one temporary network identifier by the UE, or suppressing a reporting of channel state information by the UE.

While in the semi-connected state, the UE may perform UE-initiated mobility procedures at block 1820. For example, the UE may determine (e.g., based on neighbor cell measurements, etc.) that it should perform cell reselection to a second base station, such that the UE transitions from being served by the first base station to being served by the second base station.

The UE may also re-connect to the wireless communications network at block 1825. For example, the UE may re-establish the connection with the first base station upon an indication of MO or MT data for communication via the wireless communications network. The UE may re-establish the connection (e.g., by performing a random access procedure, etc.) with the first base station according to the maintained UE context information and or maintained logical traffic connection.

The UE may autonomously perform cell reselection to the second base station. For example, the UE may perform a random access procedure to establish a connection with the second base station. The UE may indicate that it had been connected to the first base station, and the second base station may perform a context fetch to receive the context maintained at the first base station while the UE was in the semi-connected state. Thus, the UE may establish the connection (e.g., RRC connection) with the second base station according to one or more UE context information parameters from the previous connection with the first base station, and transition to being served by the second base station.

Alternatively, upon determining that it should re-select to the second base station, the UE may return to the connected state with the first base station to initiate a handover to the second base station. For example, the UE may perform an access request to the first base station from the semi-connected state while being served by the first base station, and may send measurement parameters to the first base station indicating that the handover should be initiated. Thus, the UE may re-enter the connected state with the first base station and the first base station may initiate a connected-state handover procedure for handing over the UE to the second base station, and transition to being served by the second base station.

At block 1830, upon re-establishing a connection with the second base station, the UE may perform an NAS security validation procedure with an initial transfer of data. For example, the UE may send an NAS message to the MME with the first user-plane data transfer via the second base station. If the MME does not reply with an appropriate NAS response, the UE may determine that security has been compromised, and may terminate communication with the second base station. The UE may then re-establish a connection with a different cell (e.g., different base station, etc.) of the wireless communications network to receive new security information for secure communications.

Thus, the methods 1600, 1700, and 1800 may provide for wireless communication. In some examples, aspects from two or more of the methods 1600, 1700, or 1800 described with reference to FIGS. 16, 17, or may be combined. It should be noted that the methods 1600, 1700, and 1800 are just example implementations, and that the operations of the methods 1600, 1700, or 1800 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication at a base station, comprising:
    determining, for a user equipment (UE) served by the base station and configured in a connected state with the base station, that the UE is to be transitioned out of the connected state;
    indicating to the UE that the UE should transition out of the connected state, wherein the indicating to the UE that the UE should transition out of the connected state comprises sending a first connection release message indicating that the UE should transition from the connected state to a semi-connected state, the semi-connected state associated with at least one of: suppression of monitoring of a physical downlink control channel according to at least one temporary network identifier by the UE, suppression of monitoring of a user-specific search space of the physical downlink control channel, or a first discontinuous reception (DRX) cycle for paging of the UE that is shorter than a second DRX cycle for paging of the UE when the UE is in an idle state; and
    maintaining a context for the UE at the base station subsequent to the indicating that the UE should transition out of the connected state and while the UE continues to be served by the base station.

2. The method of claim 1, further comprising:
    receiving an access request from the UE when the UE is out of the connected state;
    associating the context for the UE with the UE for connected-state operations of the UE; and
    indicating to the UE that the UE should transition to the connected state according to the context for the UE.

3. The method of claim 1, further comprising:
    determining, after the UE transitions out of the connected state, that the UE should transition to the idle state;
    indicating to the UE that the UE should transition to the idle state; and
    releasing the context for the UE.

4. The method of claim 3, wherein the determining that the UE should transition to the idle state is based on any of an expiration of an idle timer, an overload condition, a data traffic type associated with at least one logical traffic connection of the UE, an access point name (APN) associated with the at least one logical traffic connection, or combinations thereof.

5. The method of claim 1, further comprising:
    transmitting a validation paging message to the UE according to a periodic validation interval after the UE transitions out of the connected state; and
    releasing the context for the UE if a validation response is not received from the UE.

6. The method of claim 1, further comprising:
    receiving an indication from a network entity that the UE has reselected to a different base station; and
    releasing the context for the UE in response to receiving the indication.

7. The method of claim 1, further comprising:
    sending the context for the UE to at least one other base station associated with one or more of a context area of the base station, a tracking area of the base station, a neighbor list of the base station, or a neighbor list of the UE.

8. The method of claim 1, wherein the context for the UE comprises any of UE state information, UE security information, UE capability information, a radio resource control (RRC) configuration for the UE, an identity associated with at least one logical traffic connection for the UE, or combinations thereof.

9. The method of claim 1, further comprising:
    maintaining, at the base station, at least one logical traffic connection with at least one of a mobility management entity or a serving gateway for the UE after the UE transitions out of the connected state.

10. The method of claim 9, wherein the at least one logical traffic connection for the UE comprises any of a logical connection for control plane traffic, a logical connection for user plane traffic, or combinations thereof.

11. The method of claim 1, wherein the determining that the UE is to be transitioned out of the connected state is based on any of an expiration of a connected-state timer, a data traffic condition, an indication from a serving gateway, a data traffic type associated with at least one logical traffic connection of the UE, an access point name (APN) associated with the at least one logical traffic connection, or combinations thereof.

12. The method of claim 1, further comprising:
    determining whether the context for the UE should be maintained when the UE transitions out of the connected state based on any of a UE identity, a UE capability indicator, a UE configuration, UE priority information, UE data traffic history, UE connection history, a packet data network identifier associated with a data connection of the UE, a loading condition of the base station, or combinations thereof.

13. The method of claim 1, wherein the base station comprises an evolved NodeB (eNB) of a Long Term Evolution (LTE) or LTE-Advanced (LTE-A) wireless network.

14. An apparatus for wireless communication at a base station, comprising:
    a processor;
    a memory in electronic communication with the processor; and
    instructions stored in the memory, the instructions being executable by the processor to cause the apparatus to:
        determine, for a user equipment (UE) served by the base station and configured in a connected state with the base station, that the UE is to be transitioned out of the connected state;
        indicate to the UE that the UE should transition out of the connected state, wherein the indicating to the UE that the UE should transition out of the connected state comprises sending a first connection release message indicating that the UE should transition from the connected state to a semi-connected state, the semi-connected state associated with at least one of: suppression of monitoring of a physical downlink control channel according to at least one temporary network identifier by the UE, suppression of monitoring of a user-specific search space of the physical downlink control channel, or a first discontinuous reception (DRX) cycle for paging of the UE that is shorter than a second DRX cycle for paging of the UE when the UE is in an idle state; and maintain a context for the UE at the base station subsequent to the indicating that the UE should transition out of the connected state and while the UE continues to be served by the base station.

15. The apparatus of claim 14, further comprising instructions stored in the memory and executable by the processor to cause the apparatus to:
receive an access request from the UE when the UE is out of the connected state;
associate the context for the UE with the UE for connected-state operations of the UE; and
indicate to the UE that the UE should transition to the connected state according to the context for the UE.

16. The apparatus of claim 14, further comprising instructions stored in the memory and executable by the processor to cause the apparatus to:
determine, after the UE transitions out of the connected state, that the UE should transition to the idle state;
indicate to the UE that the UE should transition to the idle state; and
release the context for the UE.

17. The apparatus of claim 14, further comprising instructions stored in the memory and executable by the processor to cause the apparatus to:
page the UE according to a periodic validation interval after the UE transitions out of the connected state; and
release the context for the UE if a response to the paging is not received from the UE.

18. The apparatus of claim 14, further comprising instructions stored in the memory and executable by the processor to cause the apparatus to:
receive an indication from a network entity that the UE has reselected to a different base station; and
release the context for the UE in response to receiving the indication.

19. The apparatus of claim 14, further comprising instructions stored in the memory and executable by the processor to cause the apparatus to:
send the context for the UE to at least one other base station associated with one or more of an area configured for context sharing that includes the base station, a tracking area of the base station, a neighbor list of the base station, or a neighbor list of the UE.

20. A method for wireless communication at a user equipment (UE), comprising:
establishing a radio resource configuration in a connected state while being served by a first base station of a wireless communications network;
receiving, from the first base station, an indication that the UE is to transition to a semi-connected state, wherein the semi-connected state is associated with at least one of: suppression of monitoring of a physical downlink control channel according to at least one temporary network identifier by the UE, suppression of monitoring of a user-specific search space of the physical downlink control channel, or a first discontinuous reception (DRX) cycle for paging of the UE that is shorter than a second DRX cycle for paging of the UE when the UE is in an idle state; and
maintaining at least a portion of the radio resource configuration after transitioning to the semi-connected state while continuing to be served by the first base station.

21. The method of claim 20, further comprising:
utilizing the at least a portion of the radio resource configuration to transition to a connected state while continuing to be served by the first base station.

22. The method of claim 20, further comprising:
determining, by the UE and autonomously from the first base station, that the UE should perform cell reselection to a second base station;
sending an access request to the second base station;
transitioning from being served by the first base station to being served by the second base station; and
communicating with the second base station according to the at least a portion of the radio resource configuration.

23. The method of claim 22, further comprising:
sending, in an initial user-plane communication with the second base station, a non-access stratum (NAS) message to a mobility entity of the wireless communications network; and
terminating communication with the second base station upon determining that an NAS reply message has not been received from the mobility entity.

24. The method of claim 20, further comprising:
determining, by the UE and autonomously from the first base station, that the UE should perform cell reselection to a second base station;
sending an access request to the first base station, wherein the access request comprises one or more measurement parameters related to a handover to the second base station; and
transitioning from being served by the first base station to being served by the second base station; and
communicating with the second base station according to the at least a portion of the radio resource configuration.

25. The method of claim 20, further comprising:
receiving a validation paging message from the first base station; and
sending a validation response to the first base station, the validation response comprising a random access preamble or an uplink control information message.

26. The method of claim 20, wherein the at least a portion of the radio resource configuration comprises any of radio resource control (RRC) security information, non-access stratum (NAS) security information, a temporary network identifier for the UE, or combinations thereof.

27. An apparatus for wireless communication at a user equipment (UE), comprising:
a processor;
a memory in electronic communication with the processor; and
instructions stored in the memory, the instructions being executable by the processor to cause the apparatus to:
establish a radio resource configuration in a connected state while being served by a first base station of a wireless communications network;
receive, from the first base station, an indication that the UE is to transition to a semi-connected state, wherein the semi-connected state is associated with at least one of: suppression of monitoring of a physical downlink control channel according to at least one temporary network identifier by the UE, suppression of monitoring of a user-specific search space of the physical downlink control channel, or a first discontinuous reception (DRX) cycle for paging of the UE that is shorter than a second DRX cycle for paging of the UE when the UE is in an idle state; and
maintain at least a portion of the radio resource configuration after transitioning to the semi-connected state while continuing to be served by the first base station.

28. The apparatus of claim 27, further comprising instructions stored in the memory and executable by the processor to cause the apparatus to:

utilize the at least a portion of the radio resource configuration to transition to a connected state while continuing to be served by the first base station.

29. The apparatus of claim 27, further comprising instructions stored in the memory and executable by the processor to cause the apparatus to:
   determine, by the UE and autonomously from the first base station, that the UE should perform cell reselection to a second base station;
   send an access request to the second base station;
   transition from being served by the first base station to being served by the second base station; and
   communicate with the second base station according to the at least a portion of the radio resource configuration.

30. The apparatus of claim 27, further comprising instructions stored in the memory and executable by the processor to cause the apparatus to:
   determine, by the UE and autonomously from the first base station, that the UE should perform cell reselection to a second base station;
   send an access request to the first base station, wherein the access request comprises one or more measurement parameters related to a handover to the second base station; and
   transition from being served by the first base station to being served by the second base station; and
   communicate with the second base station according to the at least a portion of the radio resource configuration.

* * * * *